US006172882B1

(12) United States Patent
Tanaka et al.

(10) Patent No.: US 6,172,882 B1
(45) Date of Patent: Jan. 9, 2001

(54) PARTIAL RESONANCE PWM CONVERTER

(75) Inventors: Katsuaki Tanaka; Yoshihisa Okita; Kazuyuki Ito, all of Tokyo (JP)

(73) Assignee: TDK Corporation, Tokyo (JP)

( * ) Notice: Under 35 U.S.C. 154(b), the term of this patent shall be extended for 0 days.

(21) Appl. No.: 09/469,276

(22) Filed: Dec. 22, 1999

(30) Foreign Application Priority Data

Dec. 22, 1998 (JP) ................................................. 10-365185
Feb. 4, 1999 (JP) ................................................. 11-027344
Mar. 9, 1999 (JP) ................................................. 11-061328

(51) Int. Cl.$^7$ ................................................. H02M 3/335
(52) U.S. Cl. ................................................. 363/17; 363/132
(58) Field of Search ................................................. 363/16, 17, 132

(56) References Cited

U.S. PATENT DOCUMENTS

| 5,208,738 | * | 5/1993 | Jain | .......................................... | 363/17 |
| 5,231,563 | * | 7/1993 | Jitaru | ........................................ | 363/17 |
| 5,438,497 | * | 8/1995 | Jain | .......................................... | 363/17 |

FOREIGN PATENT DOCUMENTS 6-284749 10/1994 (JP) .

OTHER PUBLICATIONS

B.K. Bose, "Power Electronics AC Drives", pp. 131–140, Prentice Hall, New Jersey, U.S.A., No Date.

* cited by examiner

*Primary Examiner*—Shawn Riley
(74) *Attorney, Agent, or Firm*—Frishauf, Holtz, Goodman, Langer & Chick, P.C.

(57) ABSTRACT

The present invention provide a partial resonance PWM converter capable of making the switching loss occurring at a switch approximately zero and high efficiency by controlling a switching timing. A series circuit composed of upper and lower main switches is connected in parallel with a DC power supply, and diodes are respectively connected in parallel with each of the main switches in the opposite direction of a polarity of the DC power supply. A series circuit composed of upper and lower auxiliary switches is connected in parallel with the DC power supply, and diodes are respectively connected in parallel with each of the auxiliary switches in the opposite direction of the polarity of the DC power supply. A series resonance circuit composed of a capacitor and an inductor is inserted between the juncture of the upper and lower main switches and a juncture of the upper and lower auxiliary switches. The switching timing is controlled to make the auxiliary switch turn on just before the main switch is switched, to make the main switch turn off during the diode connected in parallel with each of the main switches is in ON condition, and to make the auxiliary switch turn off during the ON condition of the diode connected in parallel with each of the auxiliary switches.

14 Claims, 27 Drawing Sheets

PARTIAL RESONANCE PWM CONVERTER

TECHNICAL FIELD

The present invention relates to a partial resonance PWM converter.

PRIOR ART

Japanese Patent Laid-Open Publication Hei 6-284749 discloses an inverter, wherein two main switches connected in series with each other are connected in parallel with a DC power supply, two auxiliary switches connected in series with each other are respectively connected in parallel with these main switches, and a connection point of the two main switches and a connection point of the two auxiliary switches are connected with each other via an inductor and a capacitor which are connected in series with each other, so as to pick up an output at the connection point of the two main switches. Diodes are respectively connected in parallel with each of the main switches and the auxiliary switches in the opposite direction of a polarity of the DC power supply. The inverter described in this Laid-Open Publication intends to reduce and inhibit the voltage surge and the switching loss which occur at the main switch device, by taking advantage of a resonance current generated from the series circuit composed of the inductor and the capacitor. In this inverter, the main switch may be switched after making a current through the main switch device zero by turning on the auxiliary switch just before the main switch is switched. Thus the voltage surge occurring at the main switch is inhibited and a snubber circuit may also be omitted, thereby high efficiency and low noise may be established. Herefrom, this inverter is referred as a snubberless inverter in this Laid-Open Publication.

In the operation of this device, there is a problem that turn-on loss and current surge/voltage surge can be caused from making the main switch turn on at hard switching and also switching loss can potentially be increased due to occurrence of the turn-off loss at the auxiliary switch depending on a turn-off timing of the auxiliary switch device.

As another prior art, there is "Novel Zero-Current-Transition PWM Converter" described in "IEEE TRANSACTION ON POWER ELECTRONICS, Vol.9, No.6, November 1994", page 601 to 606. This circuit includes a basic circuit of a boost up converter wherein a main switch, with which a diode is connected in parallel, and an inductor are connected in series with a DC power supply, a connection point of the inductor and the main switch device is connected to a negative electrode of the DC power supply, and an output capacitor is connected between the connection point and the negative electrode via an output diode. A series resonance circuit composed of second inductor and a capacitor, and an auxiliary circuit composed of an auxiliary switch device, second diode and a third diode are additionally incorporated in the basic circuit to allow the main switch to be turned off at zero current so that voltage surge may be controlled to reduce turn-off loss. In this circuit, the auxiliary switch is turned on just before the main switch is turned off so as to generate an resonance current. Then the diode connected in parallel with the main switch device is turned on by the generated resonance current. During the above course, the main switch device is turned so as to make the zero current turn-off possible. According to these actions, the voltage surge occurring at the main switch device is controlled so that a snubber circuit may be omitted and turn-off loss may also be reduced. Therefore a partial resonance PWM boost converter characterized by high efficiency and low noise can be constructed.

As a problem of this device, it is pointed that turn-off loss is caused due to the fact that some current inevitably passes when the auxiliary switch device is turned off. Further, in the case where a continuous current is applied to the first inductor, a recovery current of the output diode passes through the main switch device when the main switch is turned on. This results in generated turn-on loss and noise. Thus this type of circuit is limited in facilitating high efficiency and low noise.

DISCLOSURE OF INVENTION

It is an object of the present invention to solve the problem described above and to provide a partial resonance PWM boost converter wherein, by controlling a switching timing of an auxiliary switch device and a main switch device, the zero current turn-on and zero current turn-off at the auxiliary switch device and the main switch device can be achieved, and the switching loss occurring at the main switch and the auxiliary switch can also be made substantial zero, so that voltage surge and current surge can be reduced to make the lower noise possible.

To achieve the aforementioned object, the present invention provides a new converter. In this converter, a series circuit composed of first and second main switch devices is connected in parallel with a DC power supply, and diodes are connected in parallel with each of the main switch devices in the opposite direction of a polarity of the DC power supply. An output circuit is located at a juncture of these main switch devices, and the main switch devices are alternatively switched to output AC or DC power. Another series circuit composed of first and second auxiliary switch devices is connected in parallel with the DC power supply, and diodes are connected in parallel with each of the auxiliary switch devices in the opposite direction of the polarity of the DC power supply. A series resonance circuit composed of a capacitor and an inductor is inserted between the juncture of the first and second main switch devices and a juncture of the first and second auxiliary switch devices. The auxiliary switch is turned on just before the main switch device is switched so as to generate a resonance at the series resonance circuit. During resonance, at least in the main switch devices, a switching timing is controlled to make the main switch device turn off when the diode connected in parallel with each of the main switch devices is turned nearly to ON condition or during ON condition of the diode. Preferably, in the auxiliary switch device, a switching timing may additionally be controlled to make the auxiliary switch device turn off during ON condition of the diode connected in parallel with each of the auxiliary switch devices. This enables the main switch device and the auxiliary switch device to be turned on at zero current and be also turned off at zero current so that switching loss can be reduced.

In another embodiment of the present invention, a series circuit composed of first and second main switch devices and a series circuit composed of first and second capacitors are respectively connected in parallel with a DC power supply. Diodes are respectively connected in parallel with each of the main switch devices in the opposite direction of a polarity of the DC power supply. Two auxiliary switch devices are connected in series between a connection point of the first and second main switch devices and a connection point of the first and second capacitors. In this connection, a bi-directional switch device composed of the auxiliary switches and diodes respectively connected in parallel with each of the auxiliary switches, and a series resonance circuit composed of an inductor and a capacitor are inserted in series. With making the connection point of the main switch devices an power output, the main switch devices are alternatively switched so as to output an AC or DC power. In the converter according to this embodiment, a switching timing is controlled to make the auxiliary switch device turn on just before the main switch is switched, and then to make the main switch device and the auxiliary switch device turn on at zero current and also turn off at zero current by detecting a current which passes through the main switch device and the auxiliary switch device. Thus the switching loss can be reduced and the noise caused from voltage surge and current surge can also be reduced.

In other embodiment of the present invention, there is provided a PWM boost converter, wherein an inductor and a main switch device are connected in series with a DC power supply, one terminal of an output capacitor is connected to a connection point of the inductor and the main switch device via an output diode, and another terminal of the capacitor is connected to a negative electrode of the DC power supply, first diode is connected in parallel with the main switch device, and, in some cases, first auxiliary switch device is connected in parallel with the output diode. A series circuit composed of first and second auxiliary switch devices is connected in parallel with the output capacitor, and second and third diodes are respectively connected to these the first and second auxiliary switch devices in the opposite characteristic with respect to an output voltage. A series resonance circuit composed of a resonance inductor and a resonance capacitor is inserted between a connection point of the first and second auxiliary switch devices and a connection point of the inductor and the main switch device, and, with making both ends of the output capacitor an output, the main switch device is switched by a PWM control so as to generate a stable DC voltage. Further a switching timing is controlled to make the lower auxiliary switch device turn on just before the main switch device is turned on so as to generate a resonance current, and then to make the main switch device turn off when the diode connected in parallel with the main switch device is turned closely to ON condition by the generated resonance current or during ON condition of the diode. This enables the main switch device to be turned on at zero current. Additionally, in the case where an inductor current is continuous during one switching cycle of the main switch device, a switching timing is controlled to make the main switch device turn on in the condition that all of the inductor current passes through the series resonance circuit, thereby no recovery current of the output diode passes through the main switch device, and a current passing through the main switch device is also increased from zero with having a particular inclination to make the zero current turn-on possible. Further, in the auxiliary switch device, a switching timing is controlled to make the auxiliary switch device turn off when the diode, which is connected in parallel with the auxiliary switch device, is in ON condition, thereby it enables the auxiliary switch device to be turned off at zero current. When the auxiliary switch device is turned on, the resonance current is also increased from zero to make the zero current turn-off possible.

According to the control mentioned above, both in the main switch device and the auxiliary switch device, the zero current turn-on and zero current turn-off can be achieved. In addition, the switching loss can be reduced and the noise caused from voltage surge and current surge can also be reduced.

In a converter according to further embodiment of the present invention, first main switch device and second main switch device, which are connected in series with each other, are connected between first terminal and second terminal, and third terminal is located at a connection point between the first main switch device and second main switch device. A series resonance circuit composed of a inductor and a capacitor, which are connected in series, is connected to a connection point between the first main switch device and second main switch device. A diode having a forward direction, which directs from the second main switch device to the first main switch device, is connected in parallel with each of the main switch devices. With selecting either two of the first, second, and third terminals as input terminals and also selecting the remaining one and one of the input terminals as output terminals, a DC power supply is connected to the two terminals selected as the input terminals. This converter provides a control means for generating an output between the output terminals by alternatively switching the first and second main switch devices, and an auxiliary switch device where a resonance circuit is completed jointly with the series resonance circuit by making it ON condition when either one of the main switch devices is in ON condition. The control means controls a switching timing to make the main switch device turn off when the diode, which is connected in parallel with the main switch device, is turned closely to ON condition by the resonance current or during ON condition of the diode, so as to make the zero current turn-off of the main device possible. The control means controls a switching timing to turn on the main switch device closely when, or after, a current passing through the main switch device becomes zero by making the resonance current run up to the value passing through the third terminal with making the auxiliary switch device turn on just before the main switch device is turned on to generate the resonance current. Thus a current passing through the main switch device is increased from zero with having a particular inclination to make the zero current turn-on possible.

The auxiliary switch device may include first and second auxiliary switches. The first and second auxiliary switches, which are connected in series with each other, may be connected between the first and second terminals. It is preferable that a diode having a forward direction, which is a direction toward the first terminal, is connected in parallel with each of the auxiliary switches, and the series resonance circuit is connected to a connection point of the first and second auxiliary switches. The control means can be adapted to control a switching timing to make the auxiliary switches turn off when the diode, which is connected in parallel with the auxiliary switch, is turned closely to ON condition due to the resonance current passing through the series resonance circuit when the auxiliary switch is turned on, or during ON condition of the diode, so as to make the zero current turn-off of the auxiliary switches possible.

The control means can also be adapted to control a switching timing of the main switch device and the auxiliary switch by a signal based on a current passing through the series resonance circuit and a current passing through the third terminal. The control means can also be adapted to control a switching timing of the main switch device and the auxiliary switch by a signal based on a voltage of both ends of the main switch device.

Furthermore in the present invention, two capacitors, which are connected in series with each other, can be connected between the first and second terminals, and the auxiliary switch device can be inserted between a voltage divided point formed by the two capacitors and the series resonance circuit. In this case, the auxiliary switch device is composed of a semiconductor switch and a diode connected in parallel with the semiconductor, and the control means can be adapted to control a switching timing to make the semiconductor switch of the auxiliary switch device turn off when the diode, which is connected in parallel with the semiconductor switch, is turned closely to ON condition due to a resonance current passing through the series resonance circuit when the semiconductor switch of the auxiliary switch device is turned on, or during in ON condition of the diode. Thus, the semiconductor switch of the auxiliary switch device can be turned off at zero current.

In this case, the control means can be adapted to control a switching timing of the main switch device and the semiconductor switch of the auxiliary switch device by an current signal based on a current passing through the series resonance circuit and a current passing through the third terminal. The control means can also be adapted to control a switching timing of the main switch device and the semiconductor switch of the auxiliary switch device by a signal based on a voltage of both ends of the capacitor of the series resonance circuit.

DETAILED DESCRIPTION OF THE PREFERRED EMBODIMENTS

Hereinafter embodiments according to the present invention will be described.

Figure 1:
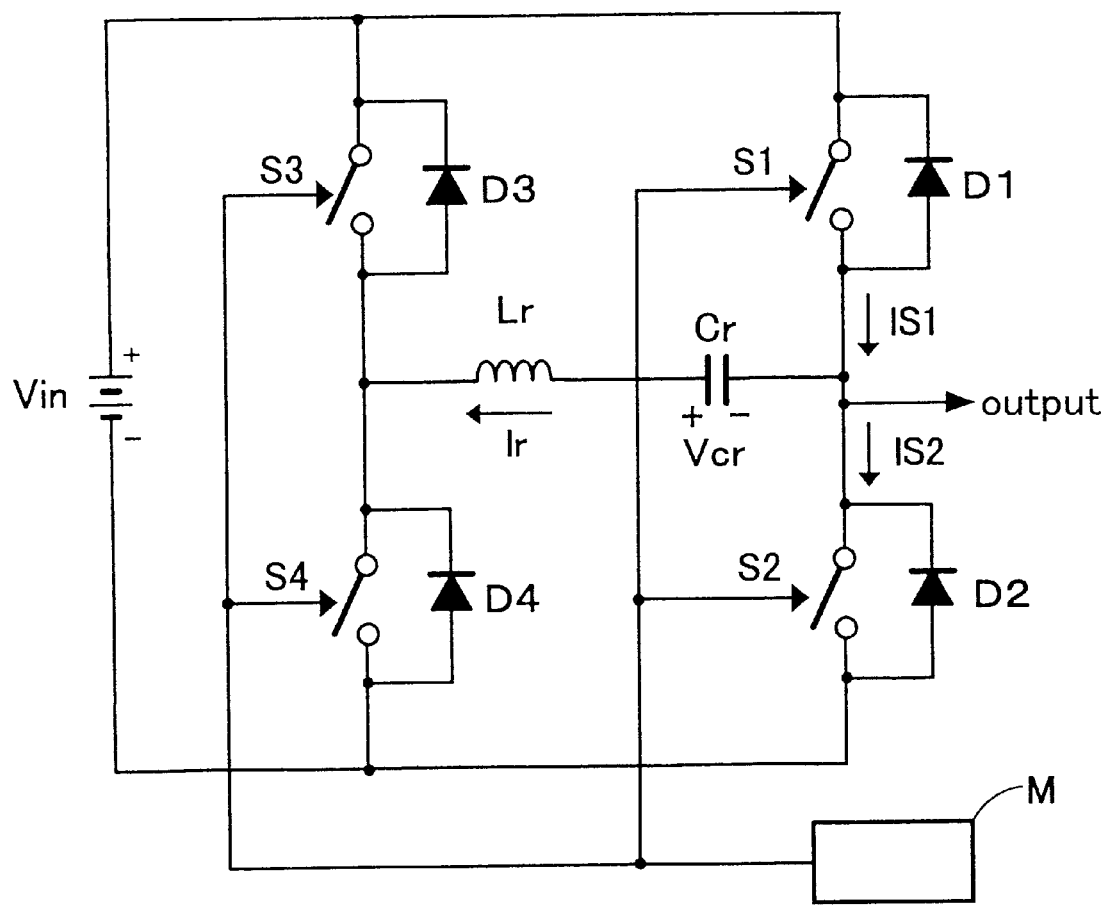
FIG. 1 is a circuit diagram showing a basic circuitry of a partial resonance PWM converter according to the present invention.

FIG. 1 shows a basic circuit as an embodiment of the present invention. In FIG. 1, two main switch devices S1,S2, which are connected in series with each other, are connected in parallel with a DC power supply Vin. Two auxiliary switch devices S3,S4, which are connected in series with each other, are also connected in parallel with main switch devices S1,S2. Two connection points of the main switch devices S1,S2 are connected to an output. An inductor Lr and a capacitor Cr are connected between a connection point of the main switch devices S1,S2 and a connection point of the auxiliary switches S3,S4. A control circuit is provided for controlling a switching timing of the main switch devices S1,S2 and the auxiliary switches S3, S4. Diodes D1,D2,D3, D4 are respectively connected in parallel with each of the main switch devices S1,S2 and the auxiliary switches S3, S4 in the opposite polarity with respect to DC power supply Vin. A series resonance circuit composed of the auxiliary switches S3,S4, inductor Lr and capacitor Cr constructs an auxiliary circuit as opposed to a main circuit including the main switch devices S1,S2. A power out is picked up from an output circuit which is connected between the connection point of the main switch devices S1 and S2 and the positive side or negative side of the DC power supply.

Figure 2:
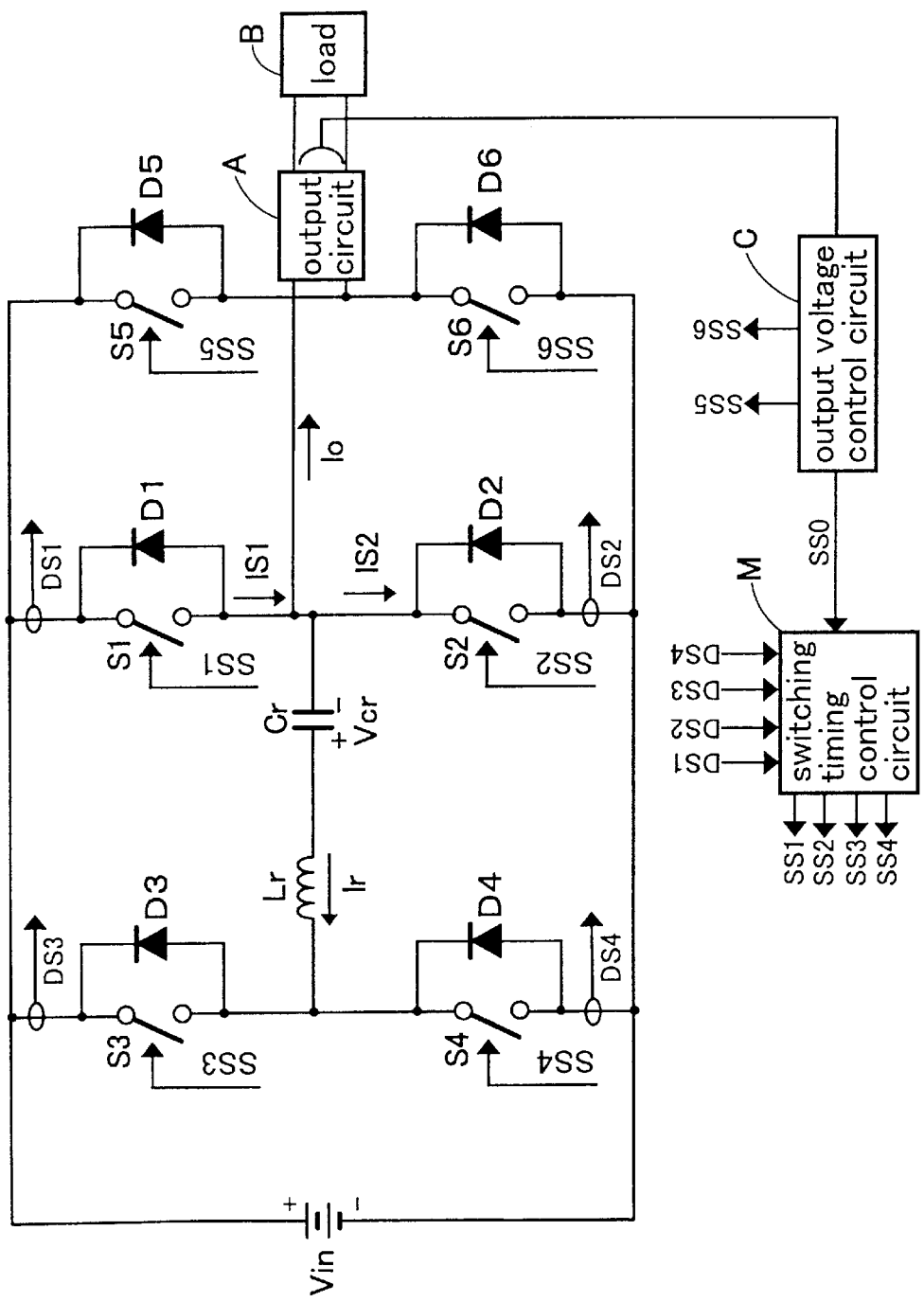
FIG. 2 is a circuit diagram showing an example of a single phase converter applied with a partial resonance PWM converter according to the present invention.
Figure 3:
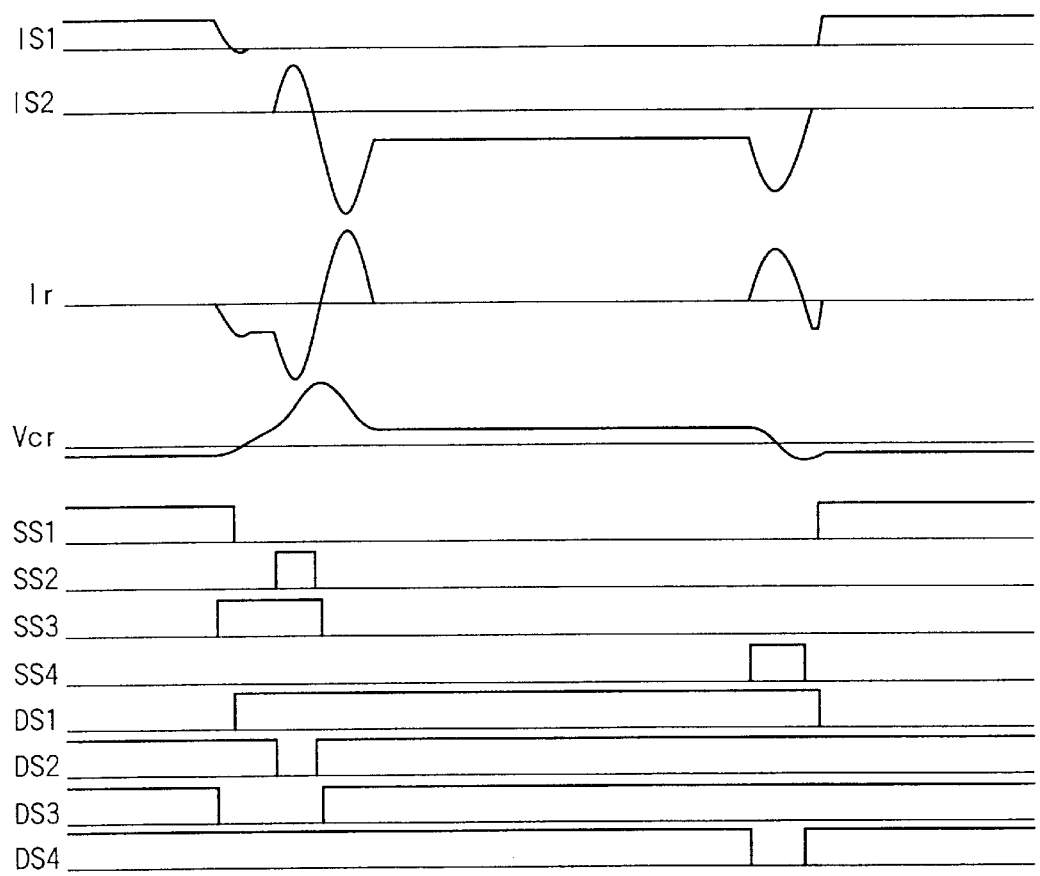
FIG. 3 is a waveform diagram showing current/voltage waveform in each part of a circuit shown in FIG. 2.
Figure 4:
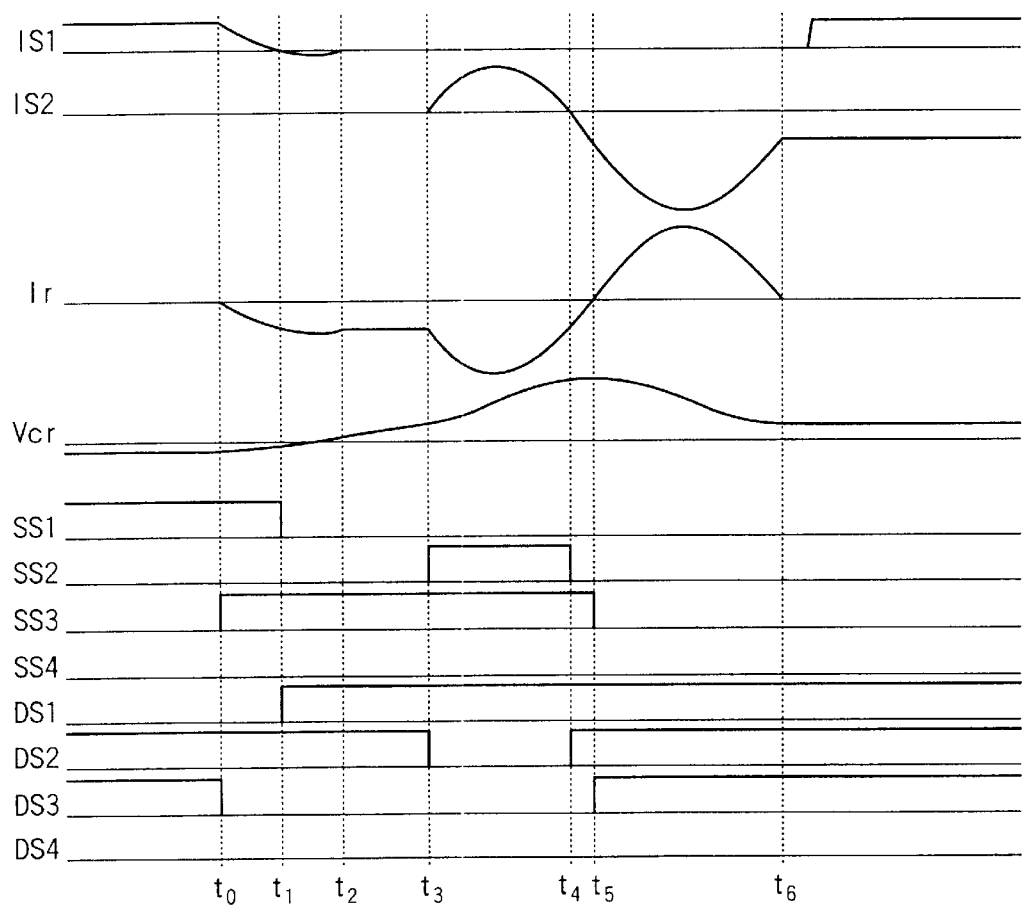
FIG. 4 is an enlarged diagram showing in a magnified form of a part of the waveform shown in FIG. 3.
Figure 5:
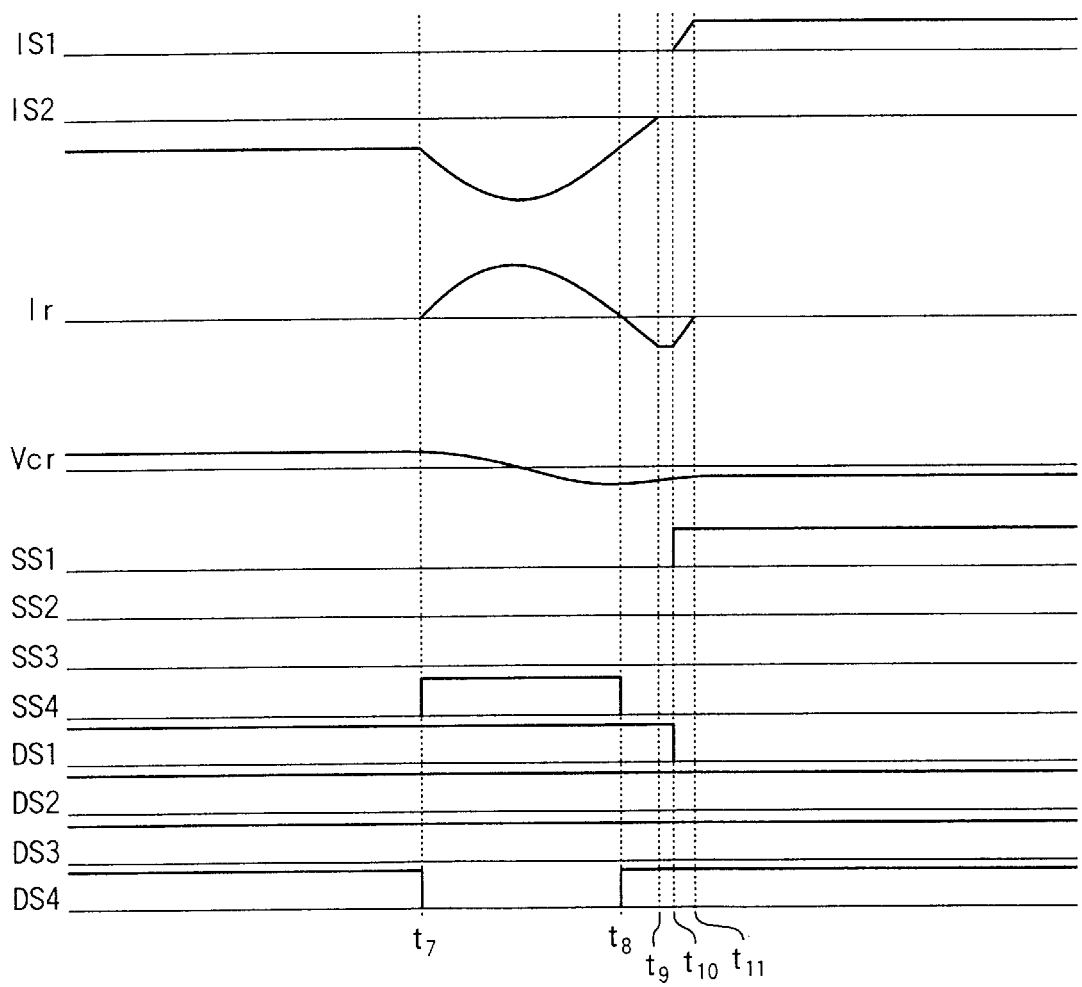
FIG. 5 is an enlarged diagram showing in a magnified form of the remaining part of the waveform shown in FIG. 3.

FIG. 2 shows another embodiment of an inverter circuit according to the present invention. FIG. 3 is a waveform diagram showing switching motion of the present embodiment in the case where load current Io passes in the direction of the arrow shown in FIG. 2. FIG. 4 and FIG. 5 are enlarged diagrams of the waveform shown in FIG. 3. In the circuit shown in FIG. 2, a bridge circuit composed of main switch devices S1,S2,S5,S6 are connected in parallel with a DC power supply Vin. Auxiliary switch devices S3,S4 are also connected in parallel with the DC power supply Vin. A series resonance circuit including an inductor Lr and a capacitor Cr is inserted between a connection point of the main switch device S1 and the main switch device S2 and a connection point of the auxiliary switch devices S3 and S4. Diodes D1,D2,D5,D6,D3,D4 are respectively connected in parallel with each of the main switch devices S1,S2,S5,S6 and the auxiliary switches S3, S4 in the opposite polarity with respect to DC power supply Vin.

The main switch devices S1,S2 and the auxiliary switch devices S3,S4 are switched at high frequency, and the main switch devices S5,S6 are switched at low frequency. An output circuit A is connected between a connection point of the main switch devices S1,S2 and a connection point of the main switch devices S5,S6. A load B is connected to an output terminal of the output circuit A and an output power is picked up by this load B.

It is desirable for the main switch devices S5,S6 to apply BJT having small conduction loss in order to reduce the loss occurring at the main switch devices because the main switch devices involves no increase of switching loss. It is also desirable for the main switch devices S1,S2,S5,S6 to apply a semiconductor switch having high speed switching ability, such as MOSFET, IGBT, and the like. It may also apply a semiconductor switch having high speed switching ability, such as MOSFET, IGBT, and the like, for the main switch devices S1,S2,S5,S6 to apply. An output voltage is detected at an output terminal of the output circuit A, and its signal is input into an output voltage control circuit C. The output voltage control circuit C generates an output signal SS0. The output voltage control circuit C performs a PWM control for controlling the pulse width of the output signal to make the output voltage to be a sine wave. The output voltage control circuit C also generates signals SS5,SS6 for driving the main switch devices S5,S6. In these signal S5,S6, a switching frequency is equal to the frequency of their output volt alternating current so that the switch devices may be alternatively switched according to the polarity of the output volt alternating current. Current detection circuits are connected to the main switch devices S1,S2 and the auxiliary switch device S3,S4. These current detection circuits output pulse signals DS1,DS2,DS3,DS4 as a threshold current is zero.

A switching timing control circuit M is provided for controlling a switching timing, and the signal SS0 and the signals DS1,DS2,DS3,DS4 of the current detection circuit is input into this control circuit M. The control circuit M outputs signals SS1,SS2,SS3,SS4 for driving the main switch devices S1,S2,S3,S4 when the rise and fall of the signal SS0 and the signals DS1,DS2,DS3,DS4 are input.

Hereat the switching timings of the switch devices will be described with reference to FIG. 4 and FIG. 5 which are an enlarged diagram of the waveform shown in FIG. 3. While a current bi-directionally passes through the load, given that the load current Io passes in the direction shown in FIG. 2, here. At this moment, the main switch device S6 is in ON condition and the main switch device S5 is in OFF condition. FIG. 4 shows a process through which the main switch deviceS1 is turned off at zero current, and the auxiliary switch device S3 is turned on and turned off at zero current. Given that,Initially, the main switch device S1 is in ON condition and a current IS1 equal to the load current Io passes. All of the main switch device S2 and the auxiliary switch devices S3,S4 are in OFF condition. At this moment, an initial voltage value of the capacitor Cr is maintained in the opposite polarity with respect to that shown in FIG. 2. When the signal SS0 from the output voltage control circuit C raises at time t0, the drive signal SS3 is raised by the signal SS0 as a trigger to make the auxiliary switch device S3 turn on, in the switching timing control circuit M. Then a resonance is initiated in a path of the auxiliary switch device S3, the inductor Lr, the capacitor Cr and the main switch device S1 according to the initial voltage value of the capacitor Cr. At this moment, since a resonance current Ir starts passing from zero in the auxiliary switch device S3, the zero current turn-on is achieved in the auxiliary switch device S3, thereby the turn-on loss becomes approximately zero. When the resonance current Ir starts passing in the opposite direction with respect to the direction of the arrow shown in FIG. 2, the current IS1 passing through the main switch device S1 starts decreasing because it can be assumes that the load current Io is approximately constant and the current IS1 is equal to a value given by taking the resonance current Ir from the load current Io. When the resonance current becomes equal to the load current Io at time t1, the current IS1 passing through the main switch device S1 becomes zero. After time t1, the resonance current Ir becomes larger than the load current Io so that a current may start passing through the main switch device S1 in the opposite direction.

When the detection signal DS1 is raised by a current detection device for setting the threshold current at zero and is input into the switching timing control circuit, the drive signal SS1 is raised by the rise of the signalDS1 as a trigger to make the main switch device S1 turn off. Thus, in the main switch device S1, the zero current turn-off is achieved so that the turn-off loss can be approximately omitted.

After the main switch device S1 is turned off, the resonance current passes through the diode D1. When a current at the diode D1 becomes zero at time t2, the resonance is terminated.

After elapsing a predetermined delay time from the pulse rise time t1 of the detection signal DS1 of the current detection device, the drive signal SS2 is raised at time t3 to make the main switch device S2 turn on. At this moment, to make the main switch device S2 turn on at zero current, this delay time period T1 to T3 is set longer than the period t1 to t2. After time t2, since the load current passes from the auxiliary switch device S3 through inductor Lr and the capacitor Cr, the resonance current starts passing through a path of the auxiliary switch device S3 inductor Lr and the capacitor Cr when the main switch device S2 is turned on at this timing (time t3 shown in FIG. 4). Since the resonance current starts passing from zero, the zero current turn-on is achieved so that the turn-on loss may become approximately zero.

During the period t2 to t3, the capacitor is charged by the load current Io. An initial value of the resonance capacitor at the time when the next resonance is started can be adjusted by controlling the delay time period and adjusting this period. This enables the amplitude of the resonance current to be adjusted so that the zero current switching may be achieved all the time.

After time t3, a current given by adding the resonance current to the load current passes through the resonance circuit. Then, at time t4, the direction of the current IS2 passing through the main switch device S2 is changed so that the detection signal DS2 of the current detection device may be raised and be input into the switching timing control circuit. The drive signal SS2 is fallen by the detection signal DS2 as a trigger to make the main switch device S2 turn off. At this moment, the main switch device is turned off at zero current so that little or no turn-off loss may occur.

When the resonance is advanced, the direction of the current passing through the auxiliary switch device S3 is changed at time t5. Whereat, the detection signal DS3 is raised and be input into the switching timing control circuit. Then the drive signal SS3 is fallen by the detection signal DS3 as a trigger to make the auxiliary switch device S3 turn off. At this moment, the auxiliary switch device is turned off at zero current so that little or no turn-off loss may occur.

After time t5, the resonance current passes through the diode D3. At time t6, the resonance current is blocked by the diode D3 to terminate the resonance and the load current Io then passes through the diode D2. At this moment, the voltage value of the capacitor Cr is maintained in the polarity show in FIG. 2 and the value becomes a initial value for the resonance to cause the next switching.

FIG. 5 shows a process through which the main switch means S1 is turned on at zero current, and the auxiliary switch device S4 is turned on and turned off at zero current.

Here, the main switch device S2 is in OFF condition and a current IS2 equal to the load current Io passes through the diode D2 in the opposite direction with respect to that of the arrow shown in FIG. 2. At this moment, an initial voltage value of the capacitor Cr is maintained in the polarity shown in FIG. 2. When the signal SS0 from the output voltage control circuit falls, the drive signal SS4 is raised by the signal SS0 as a trigger to make the auxiliary switch device S4 turn on, in the switching timing control circuit. When the auxiliary switch device S4 is tuned on at time t7, a resonance is initiated in a path of the capacitor Cr, the inductor Lr, the auxiliary switch device S4, and the diode D2 according to the initial voltage value of the capacitor Cr. At this moment, since a resonance current starts passing from zero in the auxiliary switch device S4, the zero current turn-on is achieved in the auxiliary switch device S4, thereby the turn-on loss becomes approximately zero.

The resonance current Ir passes in the direction of the arrow shown in FIG. 2, the current given by adding the load current Io to the resonance current Ir passes through the diode D2. When the resonance is advanced, the direction of the current passing through the auxiliary switch device S4 is changed at time t8. Then the detection signal DS4 is raised and is input into the switching timing control circuit. Then the drive signal SS4 is fallen by the rise of the signalDS4 as a trigger to make the auxiliary switch device S4 turn off. At this moment, in the auxiliary switch device S4, the zero current turn-off is achieved so that little or no turn-off loss may occur. After the auxiliary switch S4 is turned off, the resonance current passes through the diode D4.

At time t9, the resonance current is blocked by the diode D2 to terminate the resonance and then the load current Io passes through a path of the diode D4, the inductor Lr, and the capacitor Cr.

After elapsing a predetermined delay time from the pulse rise time t8 of the detection signal DS4 of the current detection device, the drive signal SS1 is raised to make the main switch device S1 turn on. In this case, this delay time period is set longer than the period t8 to t9. When the main switch device S1 is turned on at time t10, a path of the switch device S1, the capacitor Cr, the inductor Lr and the diode D4 is created. Thus the resonance current is reduced and a current passing through the main switch device S1 is increased. When the resonance current Ir is blocked by the diode D4 to terminate the resonance, the load current Io passes through the main switch device S1 at time 11. After the main switch device S1 is turned on, the current IS1 of the main switch device S1 is increased from zero with having a particular inclination by the resonance current Ir. Thus the zero current turn-on at the main switch device S1 is achieved so that the turn-on loss at the main switch device S1 may become approximately zero.

The aforementioned control will be described in detail. In circuits implementing the present invention, the resonance current is passed by turning on an auxiliary switch device (e.g. the auxiliary switch device S3) which is positioned at the same level as a main switch device (e.g. the main switch device S1) through which the load current passes, and the main switch device is then switched at zero current created by the resonance current thereof. When the auxiliary switch device is turned on, the capacitor Cr participated in the resonance is charged at an initial voltage value for performing the resonance. According to this initial voltage value, the amplitude of the resonance current is varied so that a condition for achieving the zero current switching can be realized. In other words, if a voltage value, which is charged in the capacitor Cr, complies with the formula as described below when the auxiliary switch device is tuned on, the main switch device can achieve the zero current switching. That is, after the auxiliary switch is turned on, a diode, which is connected in parallel with the main switch device, is turned on in the act of the resonance. If the main switch device is turned on when the diode is turned closely to such ON condition or during ON condition, the zero current switching can be achieved so that the switching loss can substantially be omitted.

$$Vcr \cdot Io \cdot \sqrt{(Lr/Cr)} \tag{1}$$

where,
Io is a load current value,
Lr is an inductance value,
Cr is a capacitance value,
Vcr is an initial voltage value of the capacitor Cr.

For making the initial voltage value of the capacitor Cr comply with the aforementioned formula (1), the following control is performed. That is, when the main switch device S1 is turned off, there exists the period t2 to t3 during which both of the main switch devices S1,S2 are turned off, as shown in FIG. 4. This period corresponds to a condition where the load current Io passes through the resonance circuit, and the resonance capacitor Cr is charged by the load current Io. By making this period longer, the charged voltage value of the capacitor Cr at time t6 when the switching is completed can be increased so that the condition (1) required for achieving the subsequent zero current turn-on at the main switch device S1 can be satisfied. Further, when the main switch device S1 is turned off, there exists the period t9 to t10 during which both of the main switch devices S1,S2 are turned off, as shown in FIG. 5. During this period, the load current Io also passes through the resonance circuit, and the resonance capacitor Cr is charged by the load current Io. As shown in FIG. 5, when making this period longer, the charged voltage value of the capacitor Cr at time t1 when the switching is completed is decreased due to the charging voltage polarity of the capacitor Cr at time t9. By adjusting this period, the condition (1) required for achieving the subsequent zero current turn-on at the main switch device S1 can be satisfied.

When the load current passes in the opposite direction with respect to that of the arrow shown in FIG. 2, the main switch device S5 is in ON condition and the main switch device S6 is in OFF condition. By controlling the switching timing as well as that described above, all of the main switch devices S1,S2 and the auxiliary switch devices S3,S4 can be turned off at zero current.

As described above, the switching loss can be made approximately zero and the turn-on and turn-off can be also conducted at zero current so that no voltage surge and no current surge may occurs and the noise can significantly be reduced.

Figure 6:
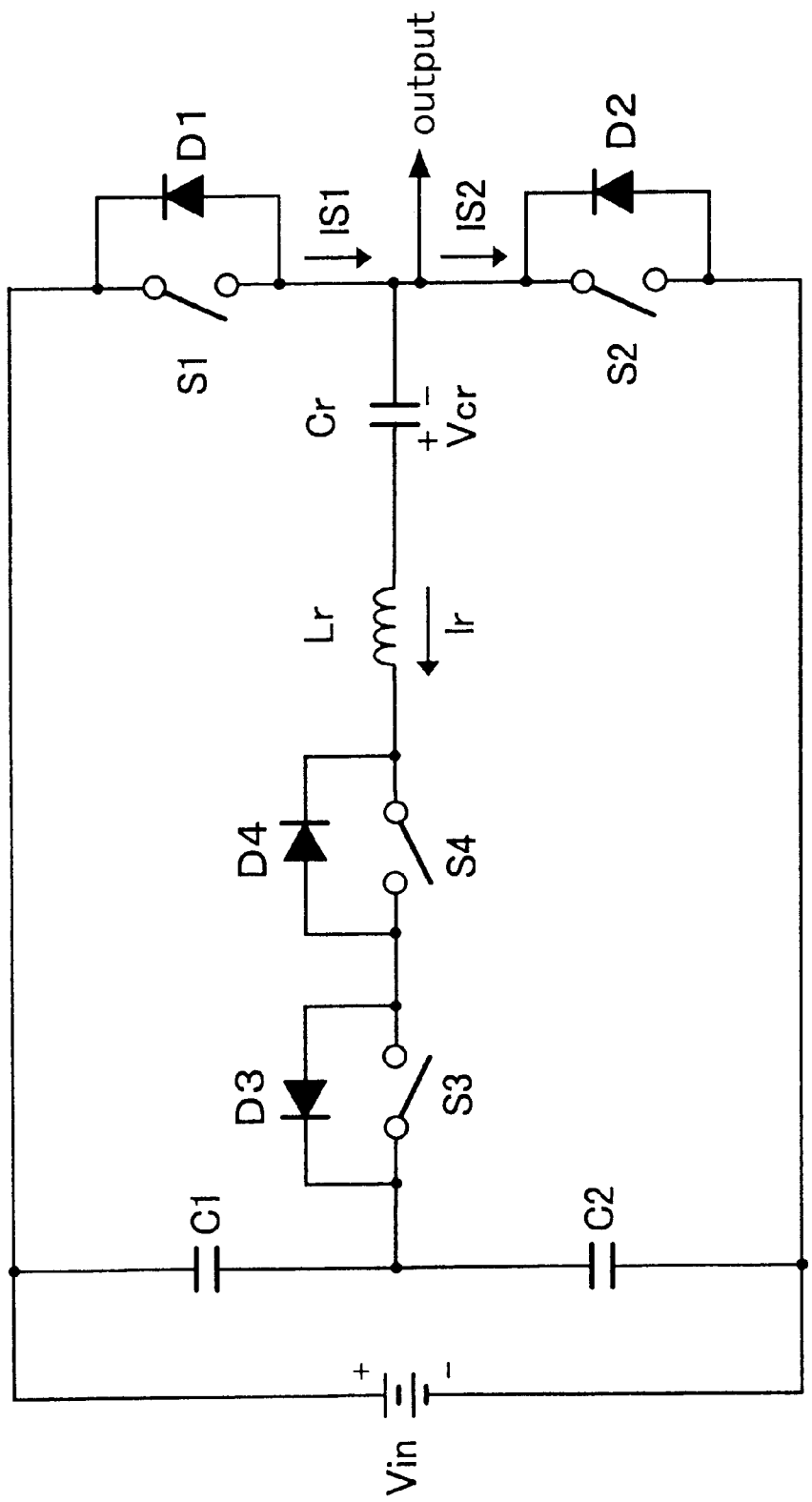
FIG. 6 a circuit diagram showing a basic circuitry of a partial resonance PWM converter according to another embodiment of the present invention.

Another embodiment of the present invention will be described hereinafter. FIG. 6 shows a basic circuit as an embodiment of the present invention. In FIG. 6, two main switch devices S1,S2, which are connected in series with each other, are connected in parallel with a DC power supply Vin. Two capacitors C1,C2, which are connected in series with each other, are connected in parallel with main switch devices S1,S2. An input voltage from the input DC power supply Vin is divided in half by these capacitors C1,C2. An auxiliary circuit is connected between a connection point of the capacitors C1,C2 and a connection point of the main switch devices S1,S2. This auxiliary circuit comprises a circuit where auxiliary switch devices S3,S4, which are bi-directional switches, an inductor Lr and a capacitor Cr are connected in series with each other. Diodes D1,D2,D3,D4 are respectively connected in parallel with each of the main switch devices S1,S2 and the auxiliary switch devices S3,S4. An output circuit is connected between the connection point of the main switch devices S1,S2 and the positive side or negative side of the DC power supply. The main switch devices are alternatively switched by a PWM control so that a stable DC voltage can be obtained.

Figure 7:
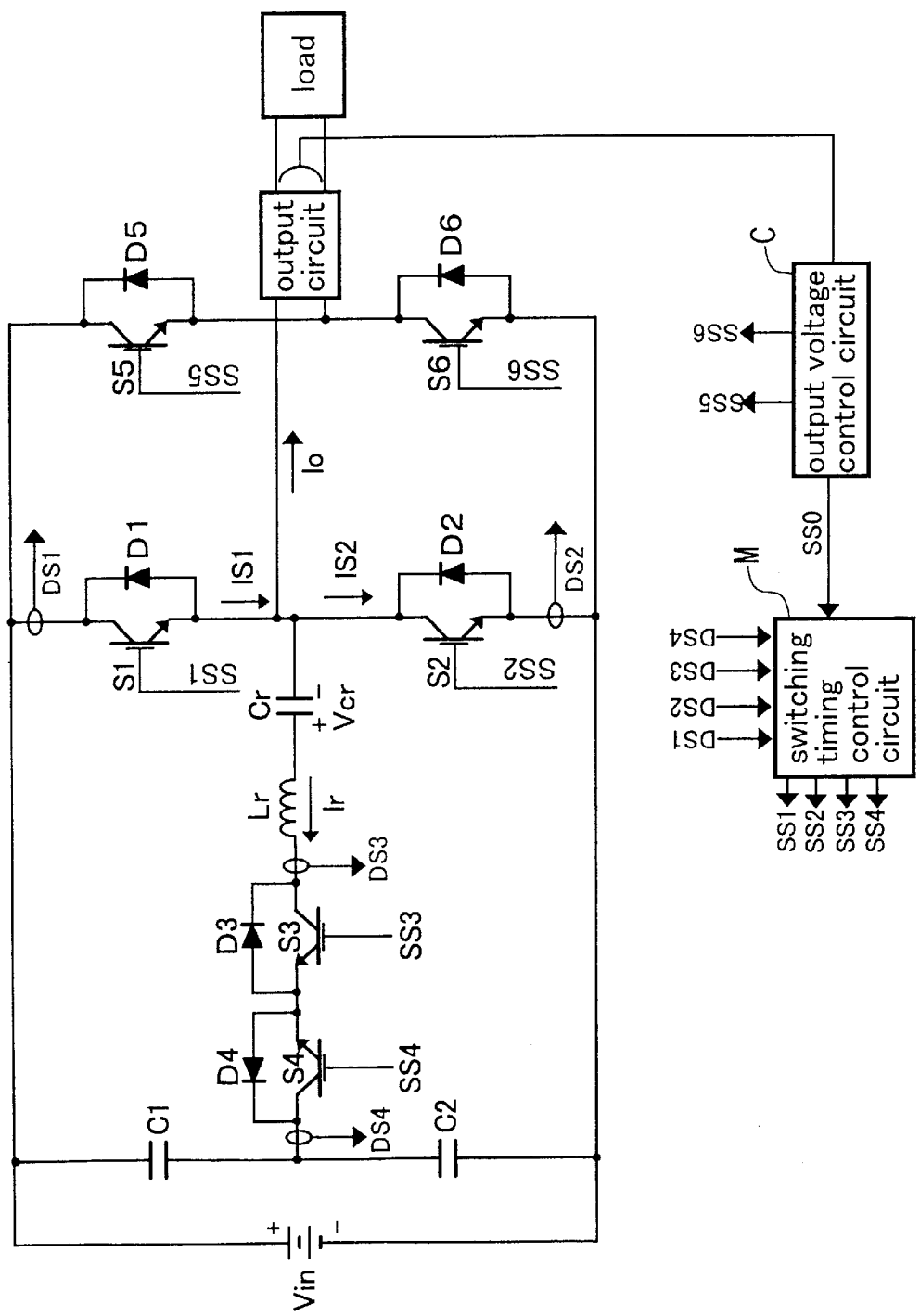
FIG. 7 is a circuit diagram showing an example of a single phase converter applied with a partial resonance PWM converter shown in FIG. 6.
Figure 8:
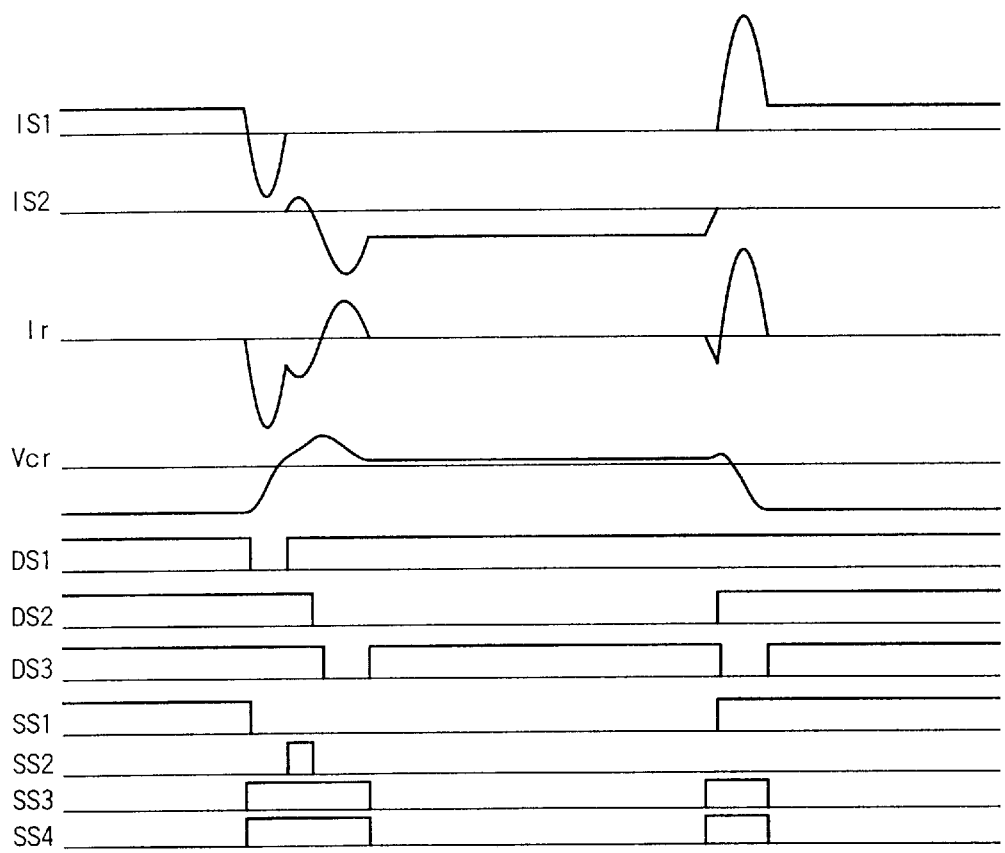
FIG. 8 is a waveform diagram fully showing current/voltage waveform in each part of a circuit shown in FIG. 7.
Figure 9:
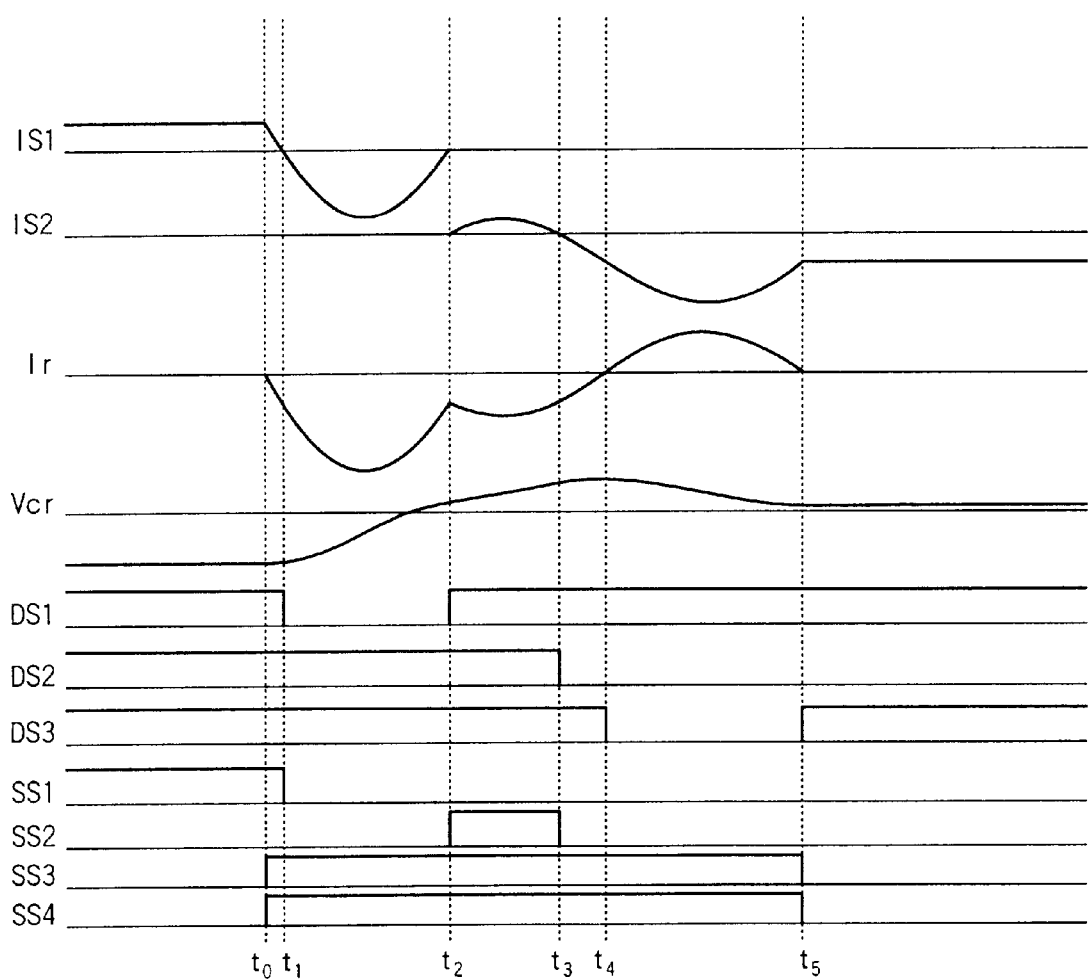
FIG. 9 is an enlarged waveform diagram showing front part of the waveform shown in FIG. 8.
Figure 10:
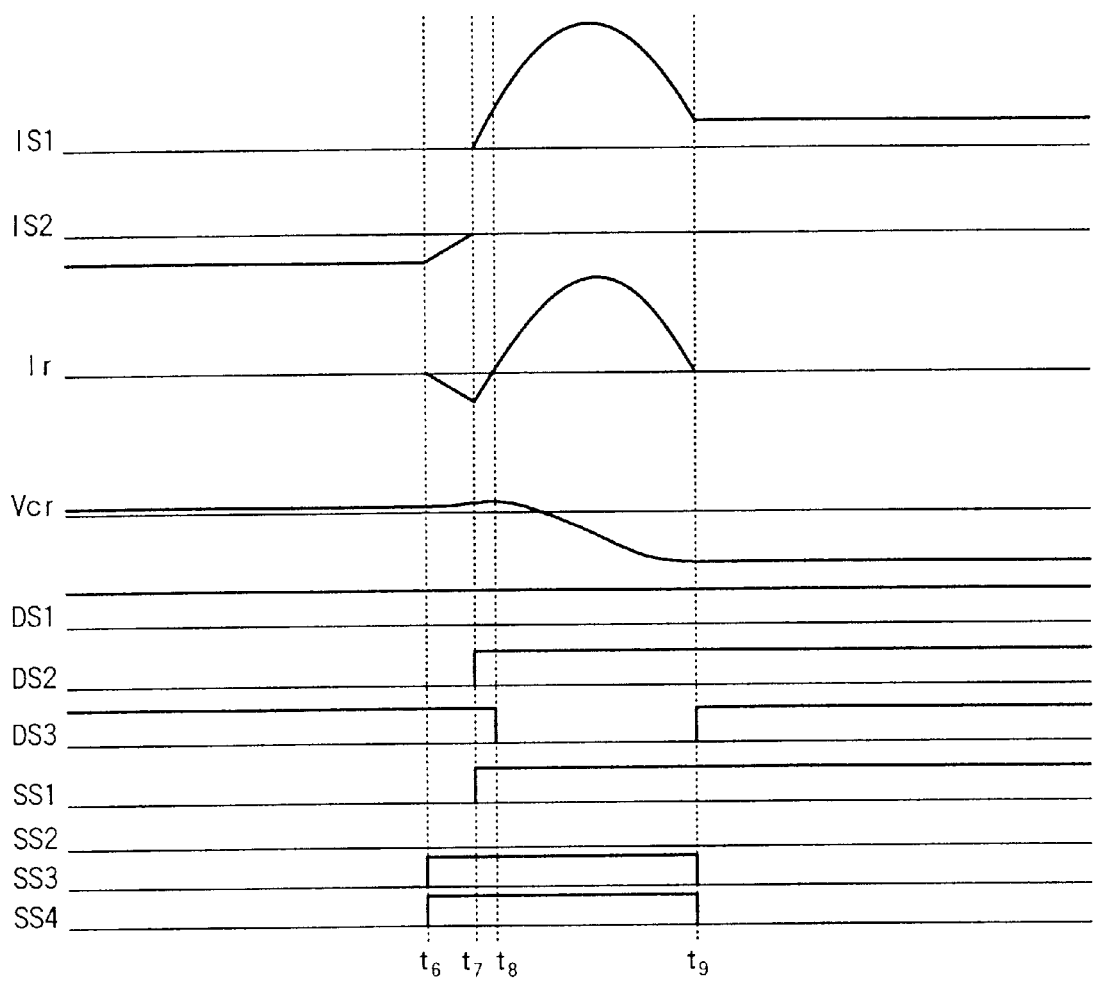
FIG. 10 is an enlarged waveform diagram showing rear part of the waveform shown in FIG. 8.

FIG. 7 shows an embodiment of an inverter circuit according to the present invention. FIG. 8 is a waveform diagram showing switching motion of the present embodiment in the case where load current Io passes in the direction of the arrow shown in FIG. 7. FIG. 9 and FIG. 10 are enlarged diagrams of the waveform shown in FIG. 8.

As shown in FIG. 7, capacitors C1,C2, which are connected in series with each other, are connected in parallel with a DC power supply Vin. A half voltage as much as an input voltage from the DC power supply is created at a connection point of the capacitors C1,C2. A bridge circuit composed of main switch devices S1,S2,S5,S6 are connected to the DC power supply Vin. Auxiliary switch devices S3,S4, which are bi-directional switches, an inductor Lr and the capacitor Cr are connected in series with each other, and they are inserted between a connection point of capacitors C1,C2 and a connection point of the main switch devices S1,S2 to construct an auxiliary circuit. Diodes D1,D2,D5,D6,D3,D4 are respectively connected in parallel with each of the main switch devices S1,S2,S5,S6 and the auxiliary switches S3, S4 in the opposite polarity with respect to a current passing through each switch devices. The main switch devices S1,S2 and the auxiliary switch devices S3,S4 are switched at high frequency, and the main switch devices S5,S6 are switched at low frequency. An output circuit A is connected between a connection point of the main switch devices S1,S2 and a connection point of the main switch devices S5,S6. A load is connected to an output terminal of the output circuit and an output volt alternating current is picked up by this load. A switching frequency of the main switch devices S5,S6 may be adapted to be to a cycle of the output voltage and may apply BJT having small conduction without any increased switching loss. The main switch devices S1,S2,S5,S6 may also apply a semiconductor switch, such as IGBT, MOSFET, BJT, and the like. In FIG. 7, IGBT is applied to all switch devices. An output voltage is detected at the output terminal of the output circuit, and its signal is input into an output voltage control circuit C.

The output voltage control circuit C performs a PWM control and outputs a signal SS whose pulse width is controlled to make the output voltage to be a sine wave. In signals SS5,SS6 for driving the main switch devices S5,S6, a switching frequency is equal to the frequency of their output volt alternating current so that the switch devices may be alternatively switched according to the polarity of the output volt alternating current. Current detection circuits are connected to the switch devices S1,S2,S3,S4. The current detection circuits detect a current passing through the switch devices as a threshold current is zero and output pulse signals DS1, DS2, DS3, DS4. A control circuit M outputs signals SS1,SS2,SS3,SS4 for driving the switch devices S1,S2,S3,S4 when the rise and fall of the signal SS0 and the signals DS1,DS2,DS3,DS4 are input.

Hereat the switching timings of the switch devices will be described with reference to FIG. 8 and FIG. 9, 10 which are an enlarged diagram of the waveform shown in FIG. 8. While a current bi-directionally passes through the load, given that the load current Io passes in the direction shown in FIG. 2, here. At this moment, the main switch device S6 is in ON condition and the main switch device S5 is in OFF condition.

FIG. 9 shows a process through which the main switch deviceS1 is turned off at zero current, and the auxiliary switch devices S3,S4 are turned on and turned off at zero current. Given that Initially, the main switch device S1 is in ON condition and a current IS1 equal to the load current Io passes. All of the main switch device S2 and the auxiliary switch devices S3,S4 are in OFF condition. An initial voltage value of the capacitor Cr is maintained in the opposite polarity with respect to that shown in FIG. 7. When the signal SS0 from the output voltage control circuit C raises, the drive signals SS3,SS4 are raised by the signal SS0 as a trigger to make the auxiliary switch device S4 turn on, in the switching timing control circuit. Then a resonance is initiated in a path of the auxiliary switch device S4, the diode D3, the inductor Lr, the capacitor Cr, the main switch device S1 and the capacitor C1 according to the voltage value which is a difference between an initial charged voltage value of the resonance capacitor Cr and a voltage value of the capacitor C1 (Vin/2). At this moment, since a resonance current Ir starts passing from zero in the auxiliary switch device S4, the zero current turn-on is achieved in the auxiliary switch device S4, and no resonance current passes through the auxiliary switch device S3, thereby the turn-on loss becomes approximately zero. When the resonance current Ir starts passing in the opposite direction with respect to the direction of the arrow shown in FIG. 7 and then the resonance current is increased larger than the load current Io, the diode D1 is turned on. When the main switch device S1 is turned off during the period t1 to t2, the zero current turn-off is-achieved so that the turn-off loss can be made approximately zero. In FIG. 9, when the current IS1 of the main switch device S1 goes through near to zero, the output signal DS1 of the current detection device is fallen and is input into the switching timing control circuit. The drive signal SS1 is fallen by this signal as a trigger to make the main switch device S1 turn off.

After the main switch S1 is turned off, the resonance current passes through the diode D1. When a current at the diode D1 becomes zero at time t2, the resonance through the main switch device S1 and the diode D1 is terminated. After time t2, both of IS1 and IS2 become zero current and the resonance current Ir and the load current Io become even. When the main switch device S2 is turned on at this period, the resonance starts passing through a path of the main switch device S2, the capacitor C2, the auxiliary switch device S4, the diode D3, the inductor Lr and the capacitor Cr. Since the resonance current starts passing from zero, the zero current turn-on is achieved so that the turn-on loss may become approximately zero. In FIG. 9, the signal DS2 of the current detection device is raised by detecting that a current at the main switch device becomes near to zero and the signal is input into the switching timing control circuit. The drive signal SS2 is raised by this signal as a trigger to make the main switch device S2 turn on. When the resonance through the main switch device S2 is advanced, the diode starts to turn on at time t3. Thus, when the main switch device S2 is turned on after time 3, the zero current turn-off is achieved so that the turn-off loss may be made approximately zero. In FIG. 9, when the current of the main switch device S2 goes through near to zero, the output signal DS2 of the current detection device is fallen and is input into the switching timing control circuit. The drive signal SS2 is fallen by this signal as a trigger to make the main switch device S2 turn off.

When the resonance is advanced, the polarity of the resonance current Ir is changed at time t4. By detecting this, the output signal DS3 of the current detection device is fallen. When the resonance is further advanced, the polarity of the resonance current Ir is changed again at time t5. By detecting this, the output signal DS3 of the current detection device is raised and this signal is input into the switching timing control circuit. Then the drive signals SS3,SS4 are fallen by this signal as a trigger to make both of the auxiliary switch devices S3,S4 turn off simultaneously. At this moment, a current passing through the auxiliary switch device S3 becomes approximately zero to achieve the zero current turn-off and no current passes through the auxiliary switch device S4 so that little or no turn-off loss may occur. After time t5, the load current passes through the diode D2.

Figure 14:
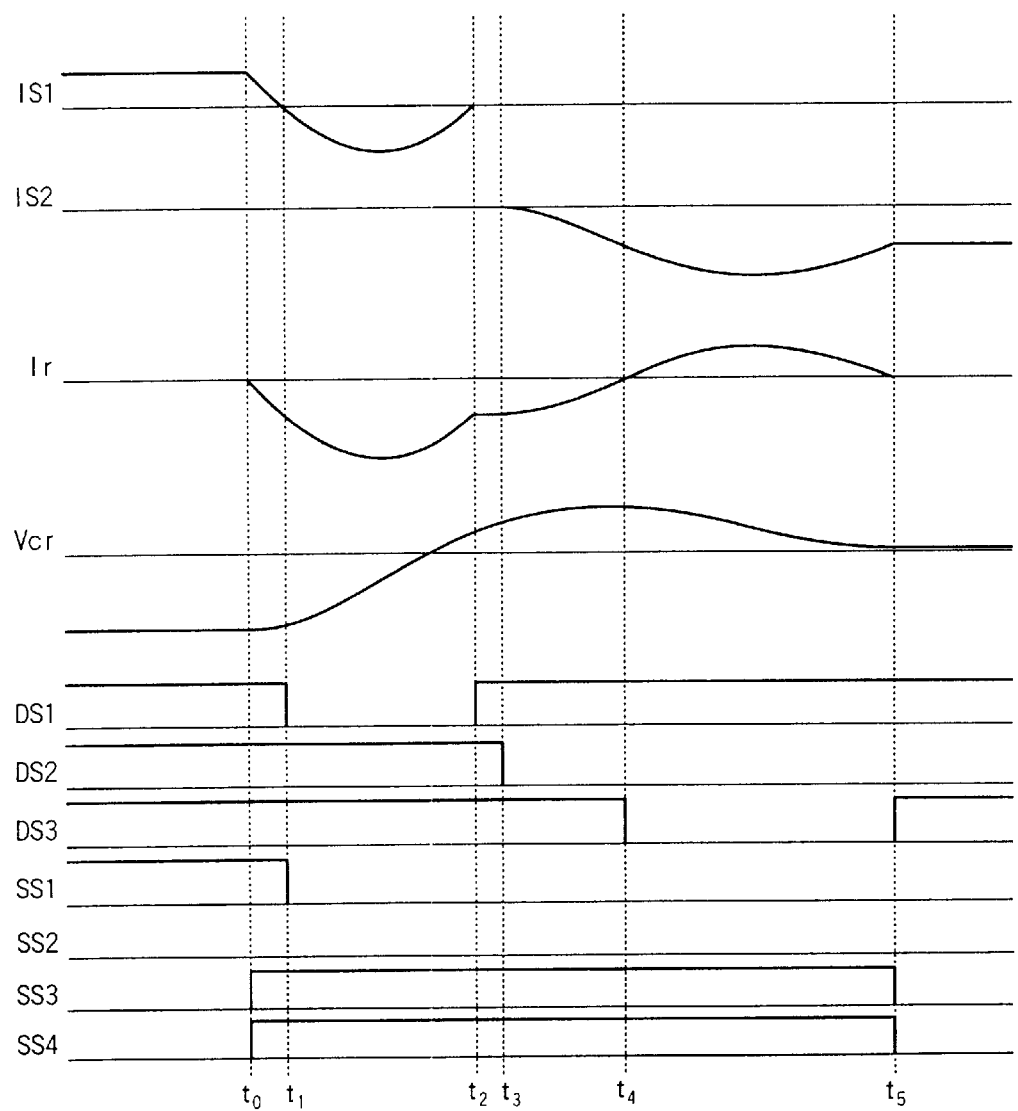
FIG. 14 is a waveform of other example corresponding to FIG. 9, where the example shown in FIG. 8 is modified in a part of control method.

FIG. 14 shows an embodiment modified in the control with respect to the aforementioned control method. A difference from FIG. 9 is only to omit a switching of the main switch device S2. In this embodiment, the zero current turn-off at the main switch device S1 and the zero current turn-on and turn-off at the auxiliary switch devices S3,S4 can be achieved.

FIG. 10 shows a process through which the main switch means S1 is turned on at zero current, and the auxiliary switch devices S3,S4 are turned on and turned off at zero current, hereinafter. Given that, Initially, the main switch device S2 is in OFF condition and a current IS2 equal to the load current Io passes through the diode D2 in the opposite direction with respect to that of the arrow shown in FIG. 7. An initial voltage value of the capacitor Cr is maintained in the polarity shown in FIG. 7. When the signal SS0 from the output voltage control circuit falls at time t6, the drive signals SS3,SS4 are raised by the signal SS0 as a trigger to make the auxiliary switch devices S3,S4 turn on simultaneously, in the switching timing circuit. Then a resonance is initiated in a path of the auxiliary switch device S4, the diode D3, the inductor Lr, the capacitor Cr, the diode D2 and the capacitor C2 according to the voltage value which is a difference between an initial charged voltage value of the resonance capacitor Cr and a voltage value of the capacitor C1(Vin/2). At this moment, since a resonance current starts passing from zero in the auxiliary switch device S4, the zero current turn-on is achieved in the auxiliary switch device S4, thereby the turn-on loss becomes approximately zero.

The current IS2 given by adding the resonance current Ir to the load current Io passes through the main switch device S2. Since the resonance current Ir passes in the opposite direction with respect to that of the arrow shown in FIG. 7, the current at the main switch device S2 is decreased after time t6. Then the current IS2 at the main switch device S2 becomes zero, the resonance current Ir and the load current Io become even. At this moment, when the main switch device S1 is turned on, the resonance current at the main switch device S1 starts passing from zero, thereby the zero current turn-on is achieved so that little or no turn-on loss may occur. In FIG. 10, when the current IS2 at the main switch device S2 becomes zero at time t7, the signal DS2 of the current detection device is raised and the signal is input into the switching timing control circuit. The drive signal SS1 is raised by this signal as a trigger to make the main switch device S1 turn on.

After time t7, a current value given by taking the resonance current Ir from the load current Io passes through the main switch device S1. When the resonance is advanced, the current IS1 at the main switch device S1 becomes equal to the load current Io at time t8 to make the polarity of the resonance current Ir change. At the moment, the output signal DS3 of the current detection device provided in the resonance circuit is fallen. Then, when the current IS1 at the main switch device S1 becomes equal to the load current Io at time t8 at time t9 and the polarity of the resonance current moves to be changed, the signal DS3 of the current detection device provided in the resonance circuit is raised and is input into the switching timing control circuit. The drive signals SS3,SS4 are raised by this signal as a trigger to make the auxiliary switch devices S3,S4 turn off. At this moment, a current passing through the auxiliary switch device S3 is approximately zero to achieve the zero current turn-off and no current passes through the auxiliary switch device S4 so that little or no turn-off loss may occur.

Hereinafter a condition for making the main switch device switch at zero current will be described.

In this control method, the resonance current is passed by turning on the auxiliary switch device, which is a bi-directional switch, before the main switch device is turned on, and the main switch device is then switched at zero current created by the resonance current thereof.

When the auxiliary switch device is turned on, the capacitor Cr participated in the resonance is charged at an initial voltage value. According to a voltage value, which is a difference between a half of the input voltage and the initial voltage of the capacitor Cr participated in the resonance, and a characteristic impedance value of the resonance circuit, the amplitude of the resonance current is varied. This shows a clear understanding of existence of a condition for achieving the zero current switching. If a voltage value Vc, which is a difference between a half of the input voltage and a voltage charged in the capacitor Cr, complies with the formula (2) as described below when the auxiliary switch device is tuned on, the main switch device can achieve the zero current switching. That is, after the auxiliary switch is turned on, a diode, which is connected in parallel with the main switch device, is turned on in the act of the resonance. If the main switch device is turned off when the diode is in ON condition, the zero current switching can be achieved so that the switching loss can substantially be omitted.

$$Vc \cdot Io \cdot \sqrt{(LR/CR)} \tag{2}$$

where,
   Io is a load current value,
   LR is an inductance value,
   CR is a capacitance value, As described above, according to this embodiment of the present invention, all switching loss can be made approximately zero and the turn-on and turn-off can be also conducted at zero current so that no voltage surge and no current surge may occurs and the noise can significantly be reduced.

Figure 11:
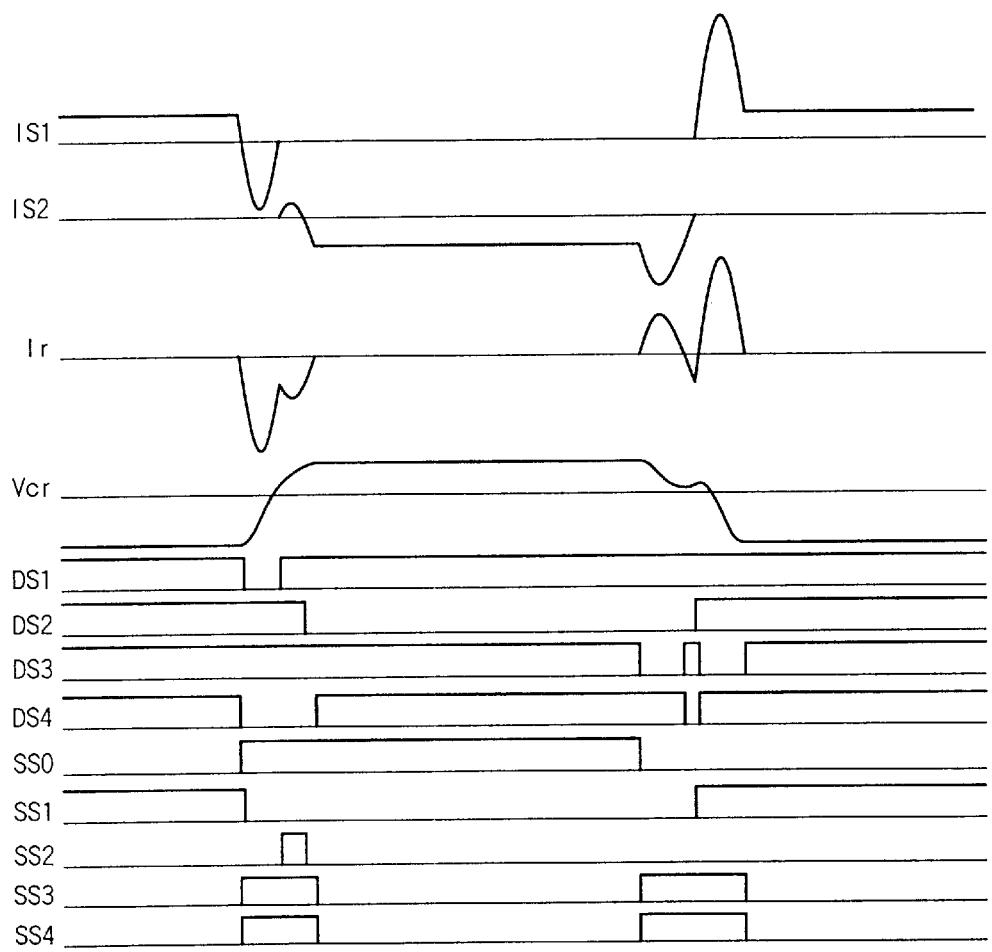
FIG. 11 is a waveform diagram fully showing current/voltage waveform in each part of a circuit shown in FIG. 7 according to other example.
Figure 12:
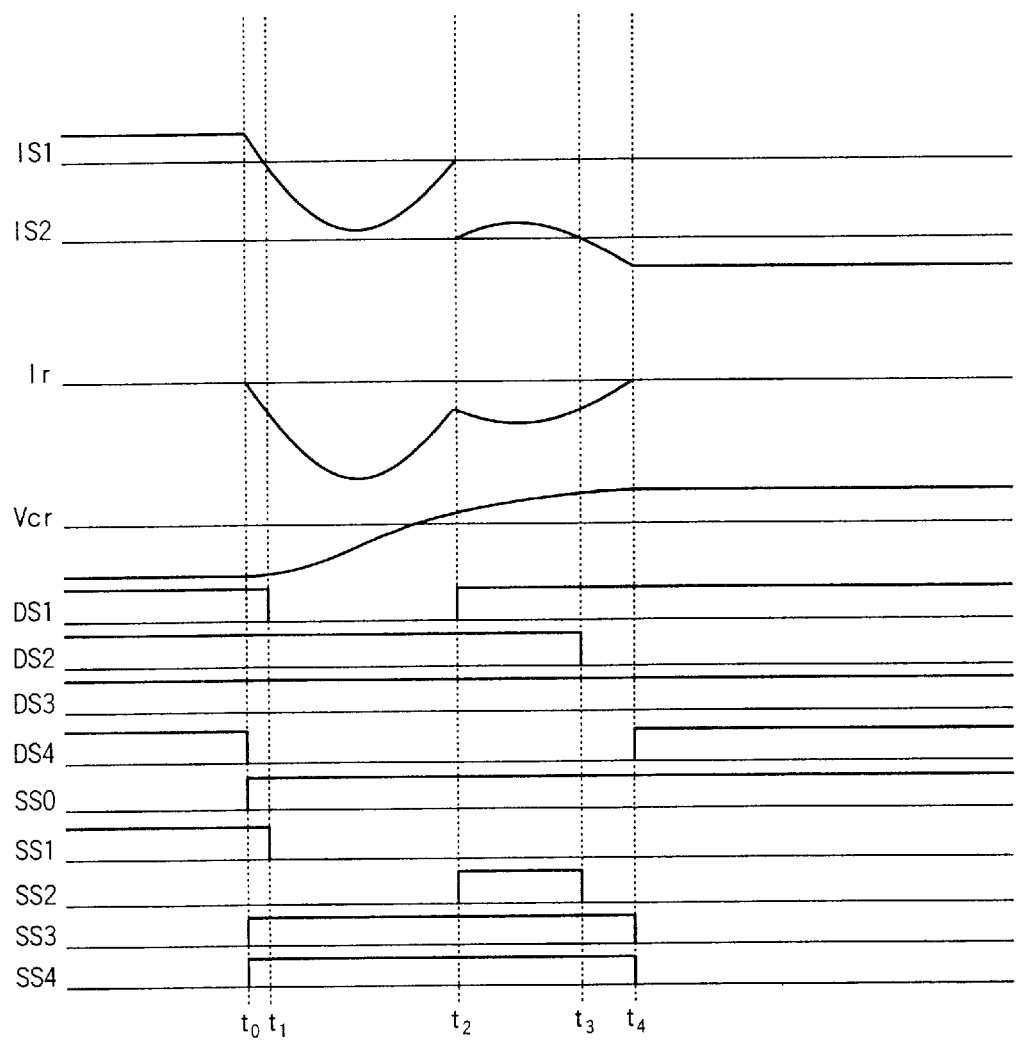
FIG. 12 is an enlarged waveform diagram showing front part of the waveform shown in FIG. 11.
Figure 13:
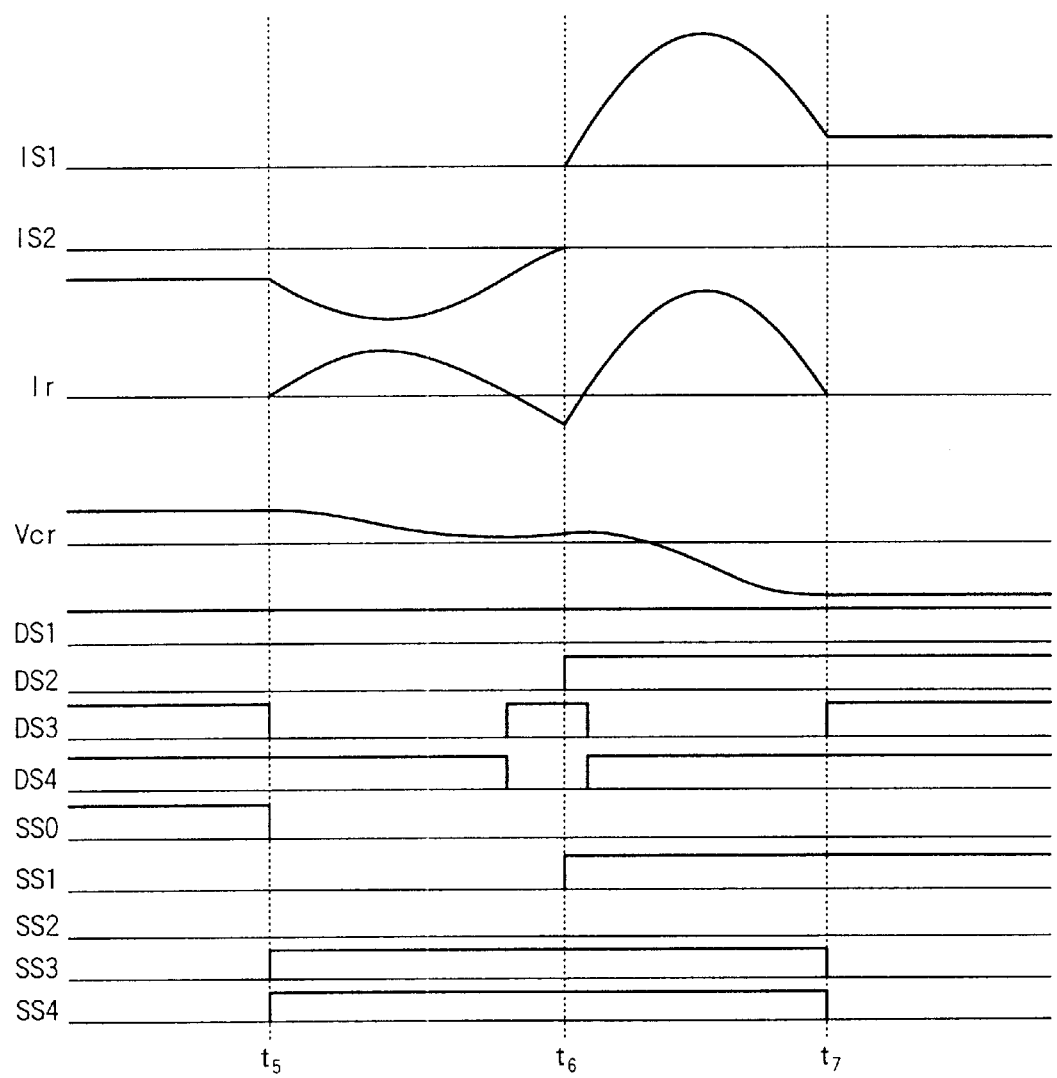
FIG. 13 is an enlarged waveform diagram showing rear part of the waveform shown in FIG. 11.

In the inverter circuit of the embodiment shown in FIG. 7, another embodiment performing a control different from the aforementioned embodiment will be described hereinafter. While the same circuit as the aforementioned embodiment is used with reference to FIG. 8 through FIG. 10 in the description of this embodiment, the same effect can be obtained by modifying a switching timing. FIG. 11 is a waveform diagram showing switching motion in the case where the load current Io passes in the direction of the arrow shown in FIG. 7. FIG. 12 and FIG. 13 are enlarged diagrams of the waveform shown in FIG. 11.

Hereat, a switching timing of the switch devices will be described with reference to FIG. 12 and FIG. 13. While a current bi-directionally passes through the load, given that the load current Io passes in the direction shown in FIG. 2, here. At this moment, the main switch device S6 is in ON condition and the main switch device S5 is in OFF condition.

FIG. 12 shows a process through which the main switch deviceS1 is turned off at zero current, and the auxiliary switch device S3,S4 is also turned on and turned off at zero current. Given that, Initially, the main switch device S1 is in ON condition and a current IS1 equal to the load current Io passes. All of the main switch device S2 and the auxiliary switch devices S3,S4 are in OFF condition. An initial voltage value of the capacitor Cr is maintained in the opposite polarity with respect to that shown in FIG. 7. When the signal SS0 from the output voltage control circuit C raises at time t0, the drive signals SS3,SS4 are raised by this signal as a trigger to make the auxiliary switch devices S3,S4 turn on, in the switching timing control circuit. Then a resonance is initiated in a path of the auxiliary switch device S4, the diode D3, the inductor Lr, the capacitor Cr, the main switch device S1 and the capacitor C1 according to the voltage value which is a difference between an initial charged voltage value of the resonance capacitor Cr and a voltage value of the capacitor C1 (Vin/2). At this moment, since a resonance current starts passing from zero in the auxiliary switch device S4, the zero current turn-on is achieved in the auxiliary switch device S4, thereby the turn-on loss becomes approximately zero.

When the resonance is advanced, the resonance current Ir and the load current Io becomes even at time T1, and a current passing through the main switch device S1 becomes zero. When the resonance is further advanced after this, a current value given by taking the load current Io from the resonance current Ir passes through the diode D1, and the diode D1 keeps in ON condition during time t1 to t2. When the main switch device S1 is turned off during the period t1 to t2, the zero current turn-off is achieved so that the turn-off loss can be made approximately zero. In FIG. 12, when the current IS1 of the main switch device S1 goes through near to zero, the output signal DS1 of the current detection device is fallen and is input into the switching timing control circuit, The drive signal SS1 is fallen by this signal as a trigger to make the main switch device S1 turn off.

After the main switch S1 is turned off, the current, which is a current value given by taking the load current Io from the resonance current Ir, passes through the diode. When the resonance is furthermore advanced, the resonance current Ir and the load current Io becomes even again and a current at the diode D1 becomes zero at time t2, the resonance through the main switch device S1 and the diode D1 is terminated. After time t2, since both of IS1 and IS2 are in OFF condition, both of the current IS1 and the current IS2 becomes zero and the resonance current Ir and the load current Io become even. When the main switch device S2 is turned on at this period, the resonance starts passing through a path of the main switch device S2, the capacitor C2, the auxiliary switch device S4, the diode D3, the inductor Lr and the capacitor Cr. Since the resonance current starts passing from zero, the zero current turn-on is achieved so that the turn-on loss may become approximately zero. In FIG. 12, the signal DS1 of the current detection device is raised by detecting that a current at the main switch device S1 becomes near to zero, and the signal is input into the switching timing control circuit. The drive signal SS2 is raised by this signal as a trigger to make the main switch device S2 turn on.

When the resonance through the main switch device S2 is advanced after time t2, the resonance current Ir and the load current Io become even at time t3 and the diode starts to turn on. At time 3, the main switch device S2 then starts to turn on, and a current value given by taking the load current Io from the resonance current Ir passes through. Thus when the main switch device S2 is turned on after time t3, the zero current turn-off is achieved so that the turn-off loss may be made approximately zero. In FIG. 12, when the current of the main switch device S2 goes through near to zero, the output signal DS2 of the current detection device is fallen and is input into the switching timing control circuit. The drive signal SS2 is fallen by this signal as a trigger to make the main switch device S2 turn off.

When the resonance is further advanced, the resonance current Ir becomes zero at time t4. By detecting this, the output signal DS4 of the current detection device is raised to make both of the auxiliary switch devices S3,S4 turn off simultaneously. At this moment, a current passing through the auxiliary switch device S4 is approximately zero to achieve the zero current turn-off, and no current passes through the auxiliary switch device S3 so that little or no turn-off loss may occur. After time t4, the load current Io passes through the diode D2.

Figure 15:
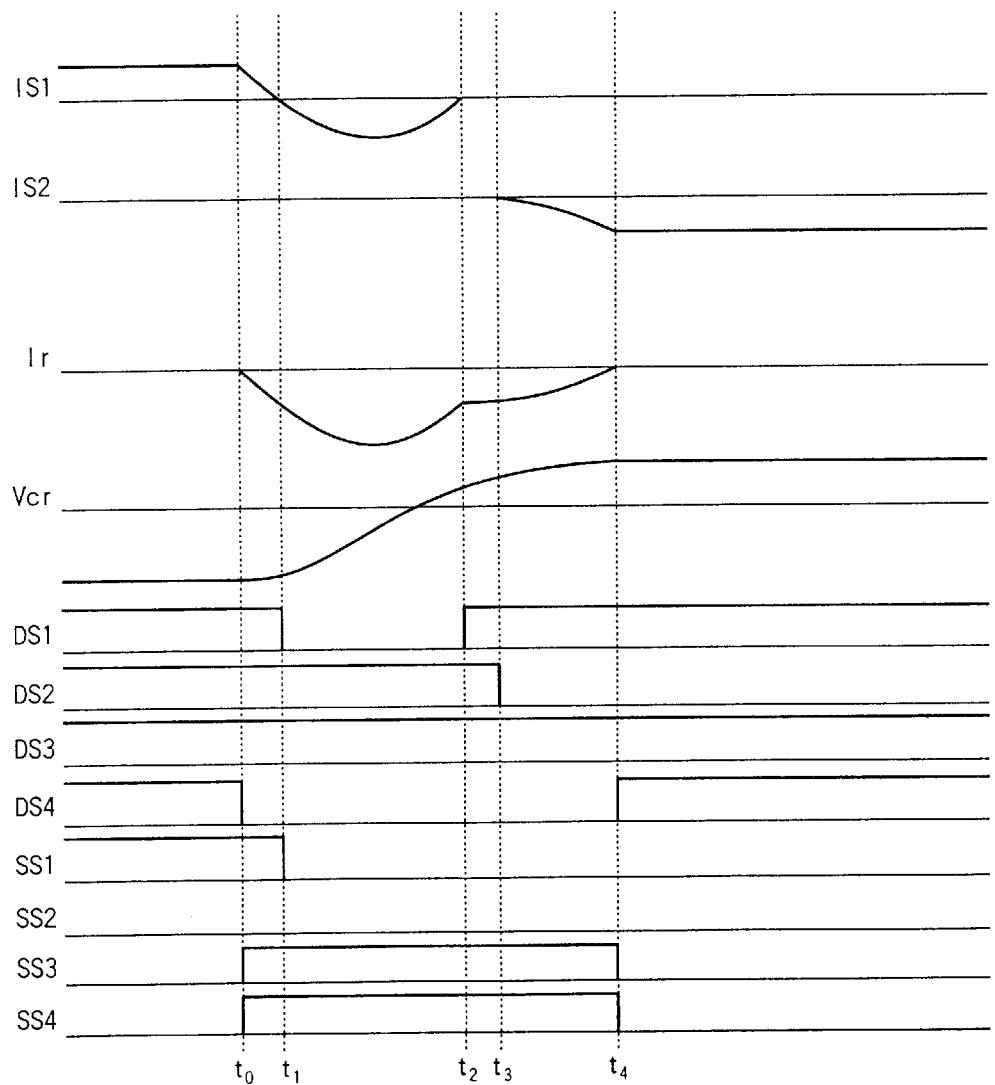
FIG. 15 is a waveform corresponding to FIG. 9, where the example shown in FIG. 11 is modified in a part of control method.

In FIG. 15, an embodiment modified in the control with respect to the aforementioned control method is shown. A difference from FIG. 12 is only to omit a switching of the main switch device S2. In this embodiment, the zero current turn-off at the main switch device S1 and the zero current turn-on and turn-off at the auxiliary switch devices S3,S4 can be achieved.

Two current detection circuits are connected to an auxiliary circuit with which the resonance inductor Lr, the resonance capacitor Cr, the auxiliary switch device S3,S4 are connected in series. Where the direction of the arrow of the resonance current shown in FIG. 7 is positive, a threshold value of the signal DS3 is set at a positive value near to zero and a threshold value of the signal DS4 is set at a negative value near to zero. When setting at such values, the signals DS3,DS4 have waveforms shown in FIG. 11.

FIG. 13 shows a process through which the main switch deviceS1 is turned on at zero current, and the auxiliary switch device S3,S4 is also turned on and turned off at zero current. The main switch device S2 is in OFF condition and a current IS2 equal to the load current Io passes through the diode D2 in the opposite direction with respect to that of the arrow shown in FIG. 7. An initial voltage value of the capacitor Cr is maintained in the polarity shown in FIG. 7. When the signal SS0 from the output voltage control circuit falls at time t5, the drive signals SS3,SS4 are raised by this signal as a trigger to make the auxiliary switch devices S3,S4 turn on simultaneously, in the switching timing circuit. Then a resonance is initiated in a path of the diode D2, the auxiliary switch device S4, the capacitor Cr, the inductor Lr, the auxiliary switch device S3 and the diodeD4 according to the voltage value which is a difference between an initial charged voltage value of the resonance capacitor Cr and a voltage value of the capacitor C1 (Vin/2). At this moment, since a resonance current starts passing from zero in the auxiliary switch device S3, the zero current turn-on is achieved in the auxiliary switch device, and no resonance current passes through the auxiliary circuit S4, thereby the turn-on loss becomes approximately zero.

After time t5, a current given by adding the resonance current Ir to the load current Io passes through the diode D2. When the resonance is advanced, a current passing through the diode D2 becomes zero, and the resonance current Ir and the load current Io become even. When the main switch device S1 is turned on during this period, a resonance current starts passing from zero in the main switch device S1, the zero current turn-on is achieved, thereby little or no turn-on loss occur. In FIG. 13, when the current passing through the diode D2 becomes near to zero, the output signal DS2 of the current detection device is raised and is input into the switching timing control circuit. The drive signal SS1 is raised by this signal as a trigger to make the main switch device S1 turn on.

After time t6, a current given by adding the resonance current Ir to the load current Io passes. When the resonance is further advanced, the resonance current Ir becomes zero at time t7. Then, the output signal DS3 of the current detection device provide in the resonance circuit is raised, and this signal is input into the switching timing control circuit. The drive signals SS3,SS4 is raised by this signal as a trigger to make the auxiliary switch devices S3,S4 turn off. At this moment, a current passing through the auxiliary switch device S4 becomes approximately zero to achieve the zero current turn-off, and little or no current passes occur. Since the resonance current Ir passes in the direction of the arrow shown in FIG. 7 and no current passes through the auxiliary switch device S4 just before time t7, no turn-off loss occur.

As described above, according to this embodiment, the zero current turn-on and zero current turn-off in the main switch device and auxiliary switch device can be achieved by detecting a current passing through the main switch device and auxiliary switch device to control a switching timing.

Figure 16:
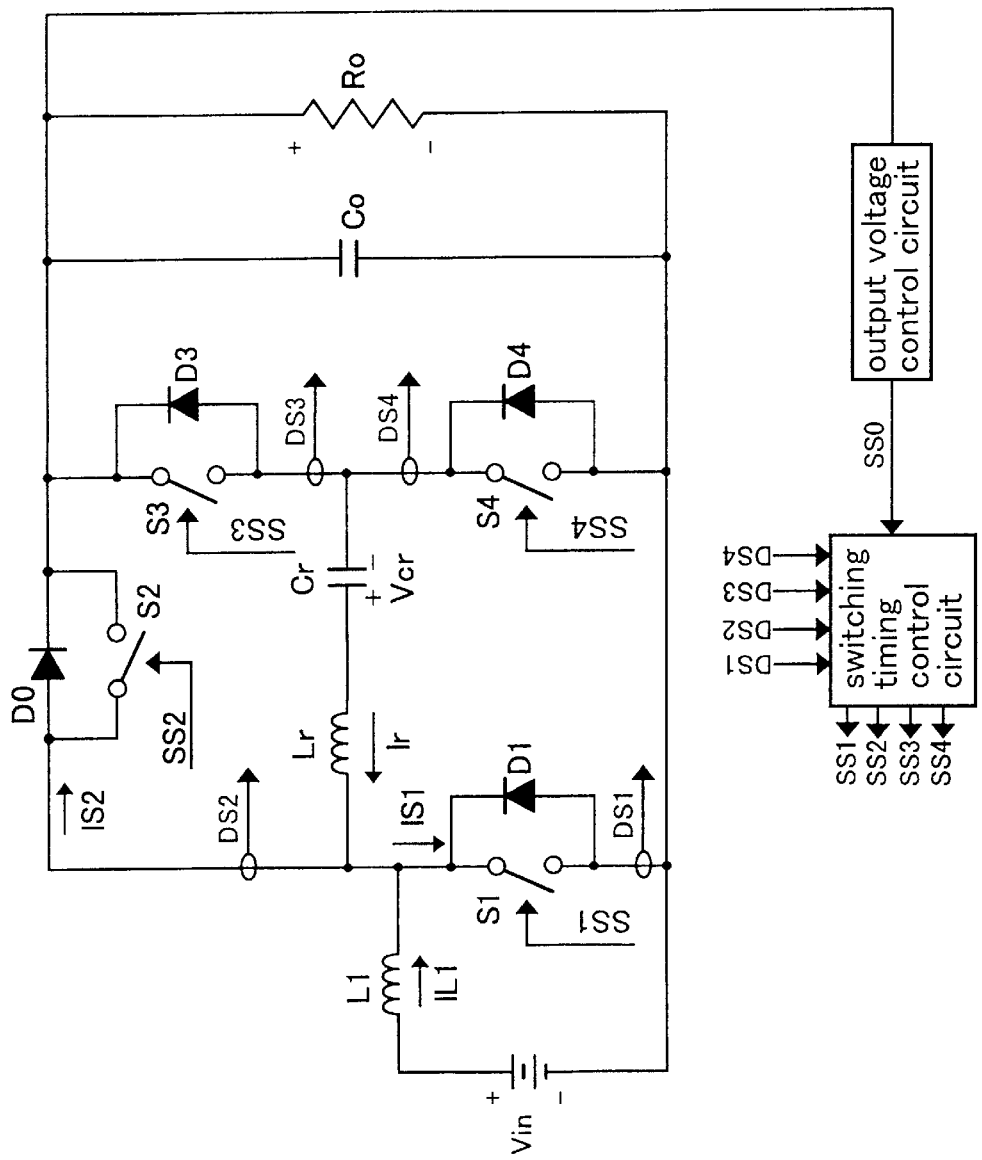
FIG. 16 a circuit diagram showing other embodiment of a partial resonance PWM converter according to the present invention.

With reference to FIG. 16, other embodiment of the present invention will be described hereinafter. A series circuit of an inductor L1 and a main switch device S1 is connected to both ends of a DC power supply Vin, and a series circuit of an output diode D0 and an output capacitor C0 is connected to both ends of the main switch device S1. A diode D1 is connected in parallel with the main switch device S1, and an auxiliary switch device S2 is connected with the output diode D0. A series circuit of an auxiliary switch device S3 and an auxiliary switch device S4 is connected to both ends of the output capacitor C0. Diodes D3,D4 are respectively connected in parallel with each of the auxiliary switch devices S3,S4 in the opposite polarity with respect to an output voltage. A series resonance circuit composed of a resonance inductor Lr and a resonance capacitor Cr is inserted between a connection point of the auxiliary switch device S3 and the auxiliary switch device S4 and a connection point of inductor L1 and the main switch device S1. With making the both ends of the output capacitor C0 an power output, an output is a applied to a load resistance R0. An output voltage value is detected from both ends of the output capacitor C0, and such signal is input into an output voltage control circuit. The output voltage control circuit performs a PWM control for controlling the pulse width of a signal SS0 to obtain a stable DC voltage. Current detection circuits are connected to the switch devices S1,S2, S3,S4. The current detection circuits detect a current passing through the switch devices as a threshold current is set at near to zero and output pulse signals DS1, DS2, DS3, DS4. A switching timing control circuit outputs signals SS1,SS2, SS3,SS4 for driving the switch devices S1,S2,S3,S4 when the rise and fall of the signal SS0 and the signals DS1,DS2, DS3,DS4 are input. MOSFET, IGBT, BJT, and the like can be applied as the switch devices.

Figure 17:
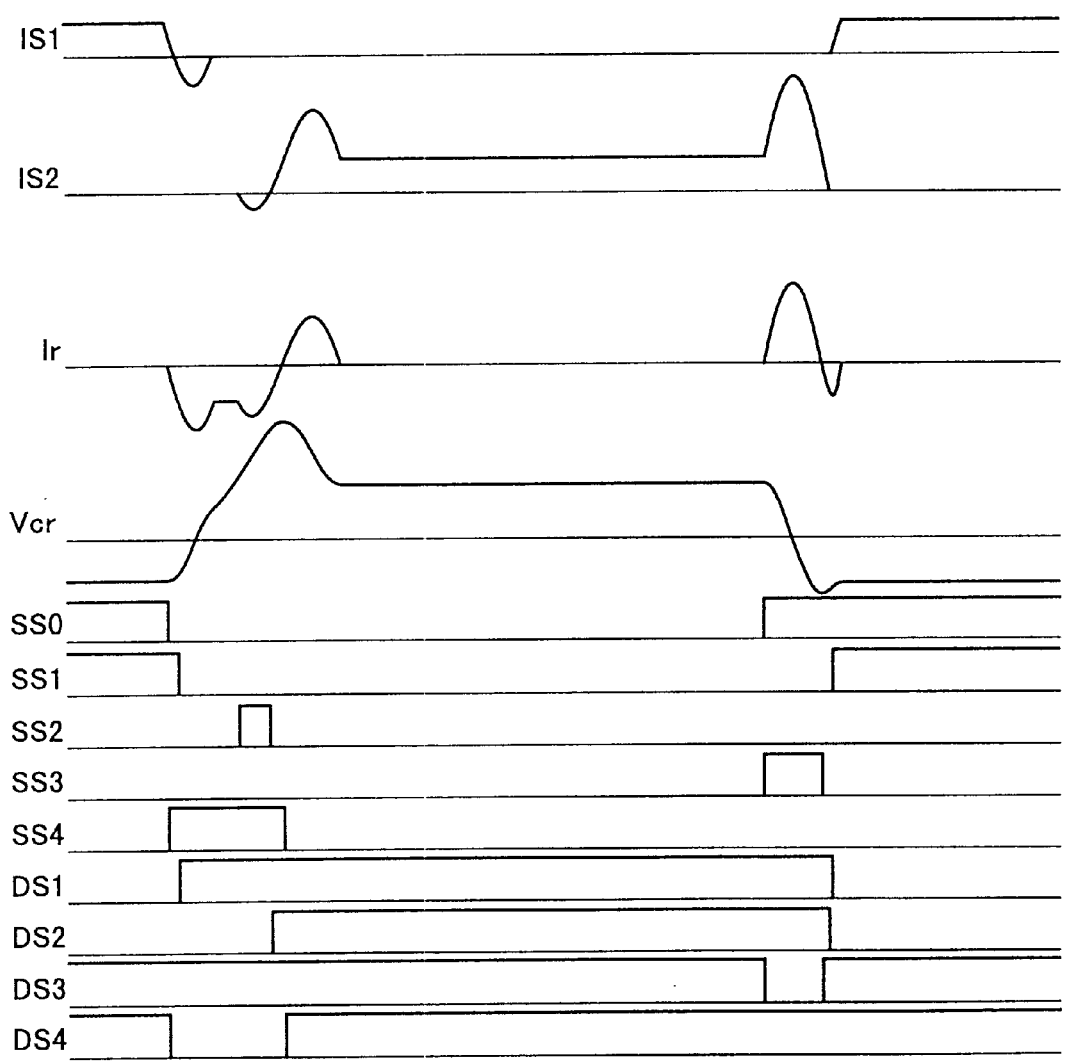
FIG. 17 is a waveform diagram showing current/voltage waveform in each part of the circuit shown in FIG. 16.

Hereat, with reference to waveform diagrams, the switching timings of the switch devices as a control method for making the switching loss approximately zero and also reducing the current surge and voltage surge occurring upon switching will be described. FIG. 17 shows waveforms of each part during the time when the main switch device is switched in one cycle, wherein a continuous current IL1 passes through the inductor L1 during one cycle.

Figure 18:
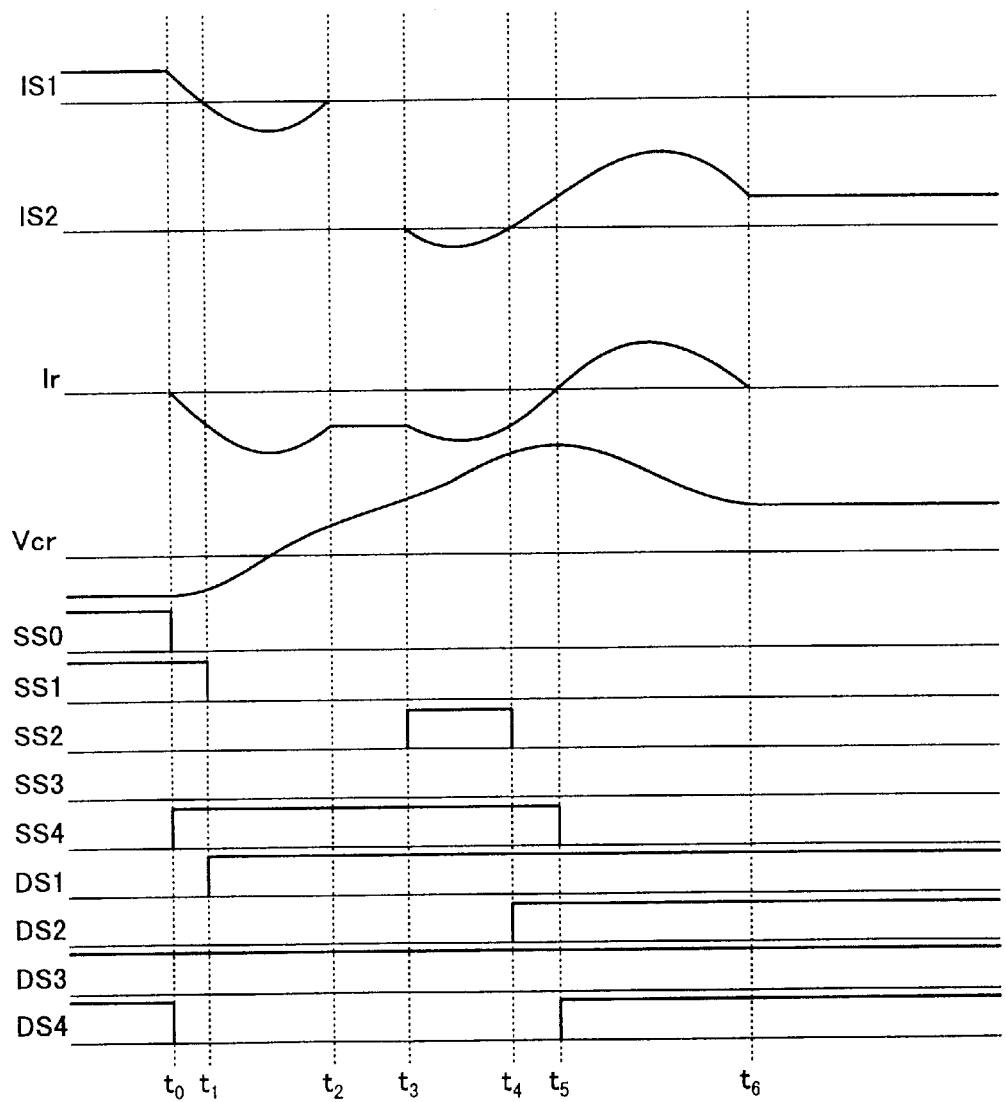
FIG. 18 is an enlarged diagram showing the waveform shown in FIG. 17.

FIG. 18 shows a process through which the main switch deviceS1 is turned off at zero current, and the auxiliary switch devices S2,S4 are turned on and turned off at zero current. During the main switch is in ON condition, the inductor L1 is excited to make an inductor current IL1 pass through the main switch device S1 in the direction of the arrow of IS1 shown in FIG. 16. All of auxiliary switches S2,S3,S4 are in OFF condition. An initial voltage value of the capacitor Cr is maintained in the opposite polarity with respect to that shown in FIG. 2. When the signal SS0 from the output voltage control circuit raises, the drive signal SS4 is raised by this signal as a trigger to make the auxiliary switch device S4 turn on, in the switching timing control circuit. Then a resonance is initiated in a path of the auxiliary switch device S4, the main switch device S1, the inductor Lr, and the capacitor Cr according to an initial charged voltage value of the resonance capacitor Cr. At this moment, since a resonance current Ir starts passing from zero in the auxiliary switch device S4, the zero current turn-on is achieved in the auxiliary switch device S4, thereby the turn-on loss becomes approximately zero. After the auxiliary switch device S4 is turned on, the resonance current Ir starts passing in the opposite direction with respect to that of the arrow shown in FIG. 6, and starts decreasing because it can be assumes that the current IL1 of the inductor L1 is approximately constant during a short period of switching and the current IS1 is equal to a value given by taking the resonance current Ir from the inductor current IL1. When the resonance current Ir becomes equal to the inductor current IL1 at time t1, the current IS1 passing through the main switch device S1 becomes zero. After time t1, the resonance current Ir becomes larger than the inductor current IL1 so that the diode connected in parallel with the main switch device S1 may be turned on during time t1 to t2 shown in FIG. 18. By turning off the main switch device S1 during this period, the zero current turn-off in the main switch device S1 is achieved so that the turn-off loss can substantially be omitted. In FIG. 18, when the current IS1 of the main switch device S1 goes through near to zero, the output signal DS1 of the current detection device is raised and is input into the switching timing control circuit. The drive signal SS1 is fallen by this signal as a trigger to make the main switch device S1 turn off.

After the main switch S1 is turned off, the resonance current Ir keeps passing through the diode D1. When a current at the diode D1 becomes zero at time t2, the resonance is terminated.

After time t2, since the current IL1 of the inductor L1 passes through a path of the resonance inductor Lr, the resonance capacitor Cr, and the auxiliary switch device S4, the resonance capacitor Cr is charged. An initial voltage value of the resonance capacitor at the time when the next resonance is started can be varied by adjusting the charging time period. This enables the amplitude of the resonance current to be adjusted so that the zero current switching may be achieved all the time.

When the auxiliary switch device S2 is turned on after time t2, the resonance current starts passing through a path of the auxiliary switch device S2, the resonance inductor Lr and the resonance capacitor Cr and the auxiliary switch device S4. Since the resonance current starts passing from zero, the zero current turn-on in the auxiliary switch device S2 is achieved so that the turn-on loss may become approximately zero.

In FIG. 18, a rise of the detection signal DS1 of the current detection device is input into the switching timing control circuit, the drive signal SS2 is raised by this signal as a trigger after elapsing a delay time (t3−t1) so as to make the auxiliary switch device S2 turn on. At this moment, the delay time(t3−t1) is controlled to make it longer than the delay time (t1−t2), in the switching timing control circuit.

When the auxiliary switch device S2 is turned on at time t3, the resonance current passes in the opposite direction with respect to that of the arrow of IS2 shown in FIG. 16. When the resonance is advanced, the direction of the current IS2 passing through the auxiliary switch device S2 at time t4 so that the detection signal DS2 of the current detection device may be raised and then is input into the switching timing control circuit. Then the drive signal SS2 is fallen by the rise of the detection signal DS2 as a trigger to make the auxiliary switch device S2 turn off. At this moment, the auxiliary switch device S2 is turned off at zero current so that little or no turn-off loss may occur. After time t4, the output diode D0 is turned on and a current given by adding the resonance current resonance current Ir to the inductor current IL1.

When the resonance is advanced, the direction of the current passing through the auxiliary switch device S4 is changed at time t5. Then the detection signal DS4 of the current detection device is raised and is input into the switching timing control circuit. Then the drive signal SS4 is fallen by the rise of the signal DS4 as a trigger to make the auxiliary switch device S4 turn off. At this moment, the zero current turn-off in the auxiliary switch device S4 is achieved so that little or no turn-off loss may occur.

Though the resonance current Ir passes through the diode D4 connected in parallel with the auxiliary switch device S4 after time t5, the resonance current Ir is blocked by the diode D4 at time t6 to terminate the resonance. Thus, after time t6, since the inductor current IL1 passes through the output diode D0, an exciting energy of the inductor L1 is transferred to the output capacitor C0.

Figure 19:
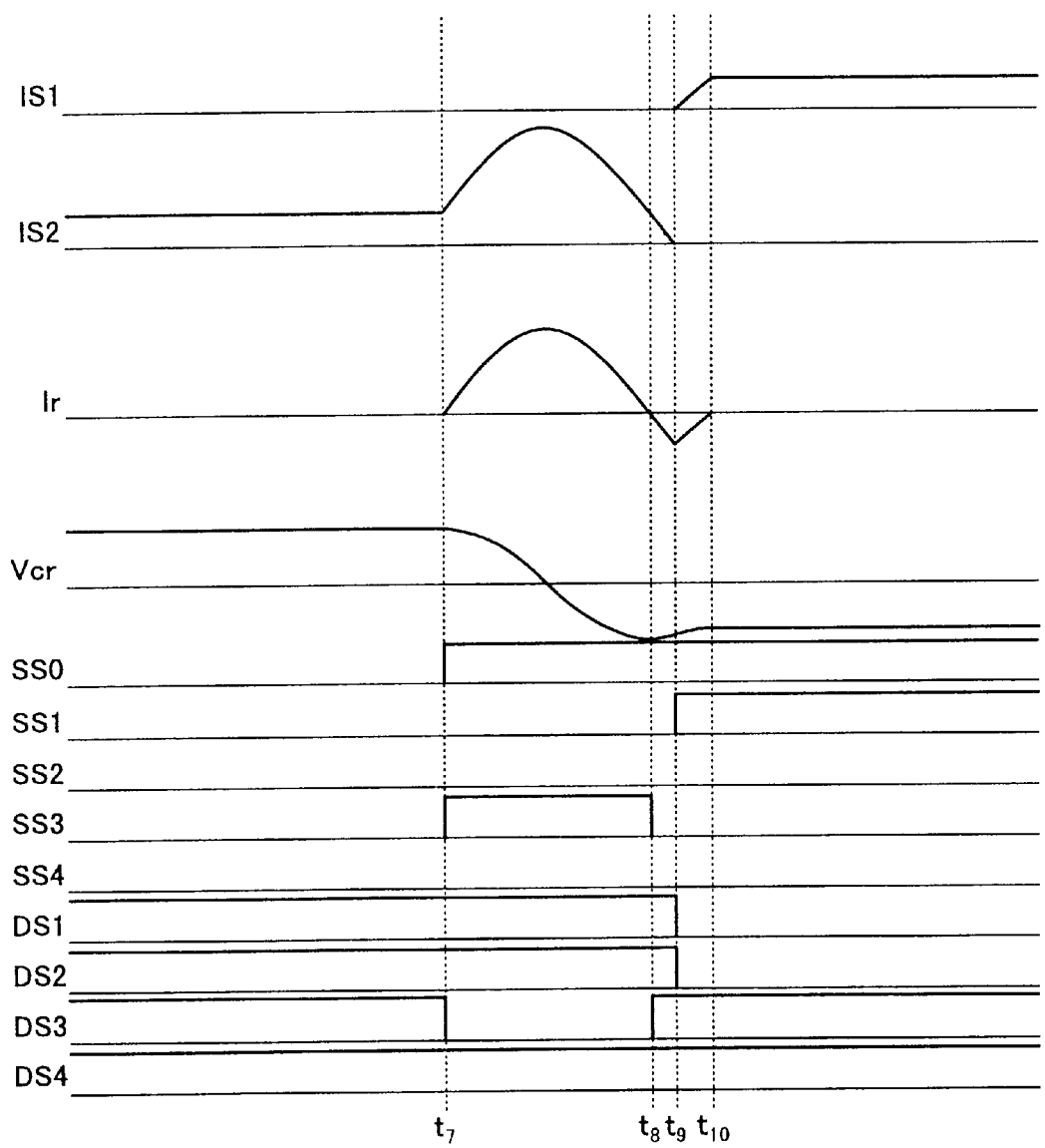
FIG. 19 is an enlarged diagram showing the waveform shown in FIG. 17.

FIG. 19 shows a process through which the main switch means S1 is turned on at zero current, and the auxiliary switch device S3 is turned on and turned off at zero current.

The inductor current IL1 passes through the output diode D0. The initial voltage value of the capacitor Cr is maintained in the polarity shown in FIG. 16 by the resonance generated at the time when the main switch device S1 is turned off. When the signal SS0 from the output voltage control circuit falls, the drive signal SS3 is raised by this signal as a trigger to make the auxiliary switch device S3 turn on, in the switching timing control circuit. When the auxiliary switch device S3 is tuned on at time t7, a resonance is initiated in a path of the resonance capacitor Cr, the resonance inductor Lr and the output diode D2 according to the initial voltage value of the resonance capacitor Cr. At this moment, since a resonance current starts passing from zero in the auxiliary switch device S3, the zero current turn-on is achieved in the auxiliary switch device S3, thereby the turn-on loss becomes approximately zero.

The resonance current passes in the direction of the arrow shown in FIG. 16 so that a current given by adding the inductor current IL1 to the resonance current Ir may pass through the diode D0.

When the resonance is advanced, the direction of the current passing through the auxiliary switch device S3 is changed at time t8. Then the detection signal DS3 is raised and is input into the switching timing control circuit. Then the drive signal SS3 is fallen by the rise of the signal DS3 as a trigger to make the auxiliary switch device S3 turn off. At this moment, the auxiliary switch device S3 is turned off at zero current so that little or no turn-off loss may occur.

After time t8, the direction on the resonance current Ir is inverted. Then the current given by adding the inductor current IL1 to the resonance current Ir is decreased and the current passing through the diode D0 finally becomes zero at time t9. At this moment, the detection signal DS2 of the current detection device is fallen and the signal is input into the switching timing control circuit. The drive signal SS1 is raised by the fall of detection signal DS2 as a trigger to make the main switch device S1 turn on. At time t9, all of the inductor current IL1 passes into the resonance circuit. In this condition, when the main switch device S1 is turned on, a path of the output capacitor C0, the diode D3, the resonance capacitor Cr and the resonance inductor Lr is created and then the resonance current Ir passing in the opposite direction with respect to that of the arrow shown in FIG. 16 start decreasing. That is, the current, which is a difference between the inductor current IL1 and the resonance current Ir, is increased from zero and this current passes through the main switch device S1, thereby the zero current turn-on in the main switch device S1 is achieved so that the turn-on loss may become approximately zero.

After the main switch device is turned on, the resonance current becomes zero at time t10, and the inductor current IL1 passes into the output capacitor C0 through the output diode D0.

Figure 20:
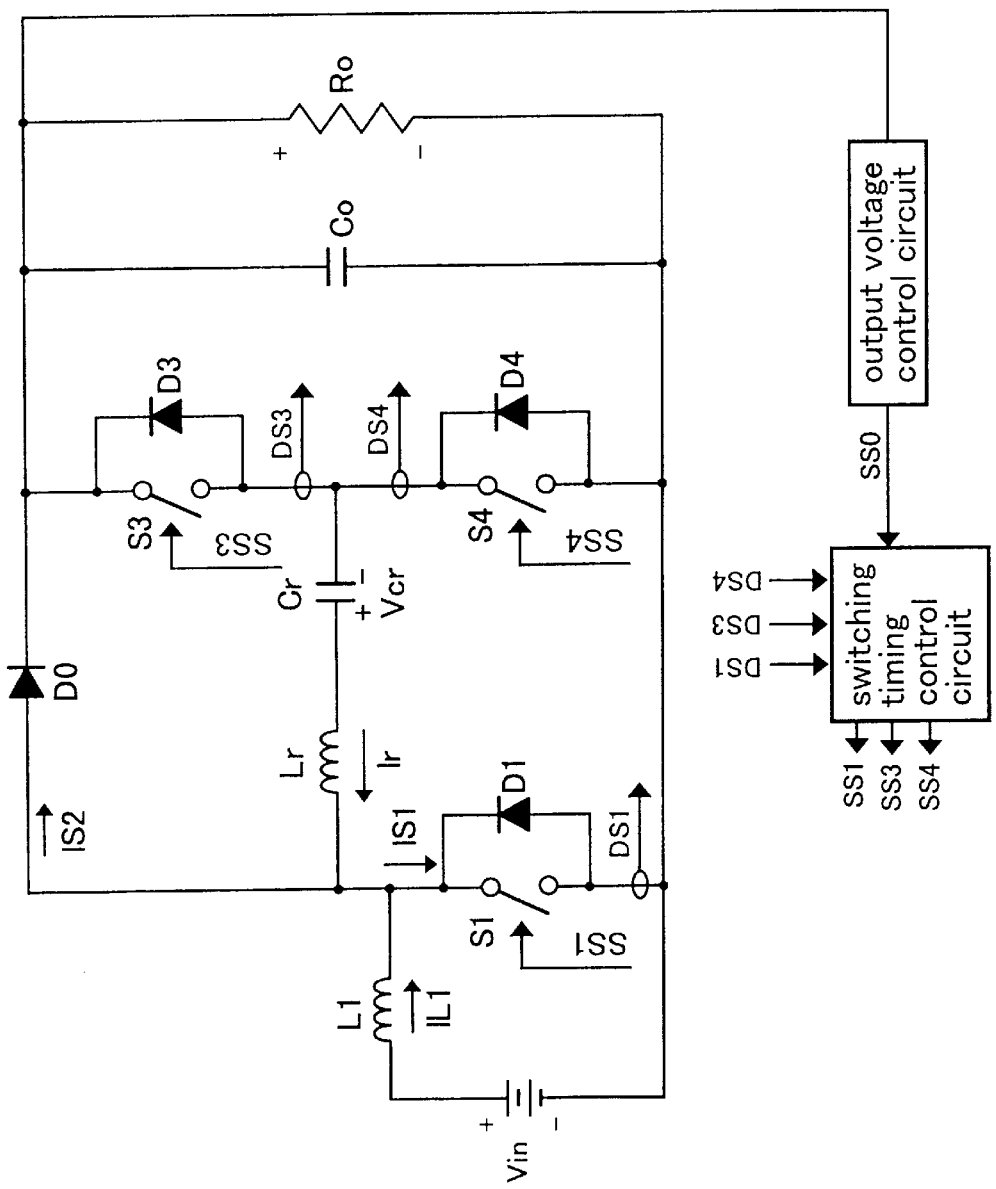
FIG. 20 a circuit diagram showing further embodiment of a partial resonance PWM converter according to the present invention.

Further embodiment of the present invention is shown in FIG. 20. In this circuit, the auxiliary switch device S2 connected in parallel with the output diode D0 and also the current detection device outputting the signal DS2 are detached from the circuit shown in FIG. 16.

Figure 21:
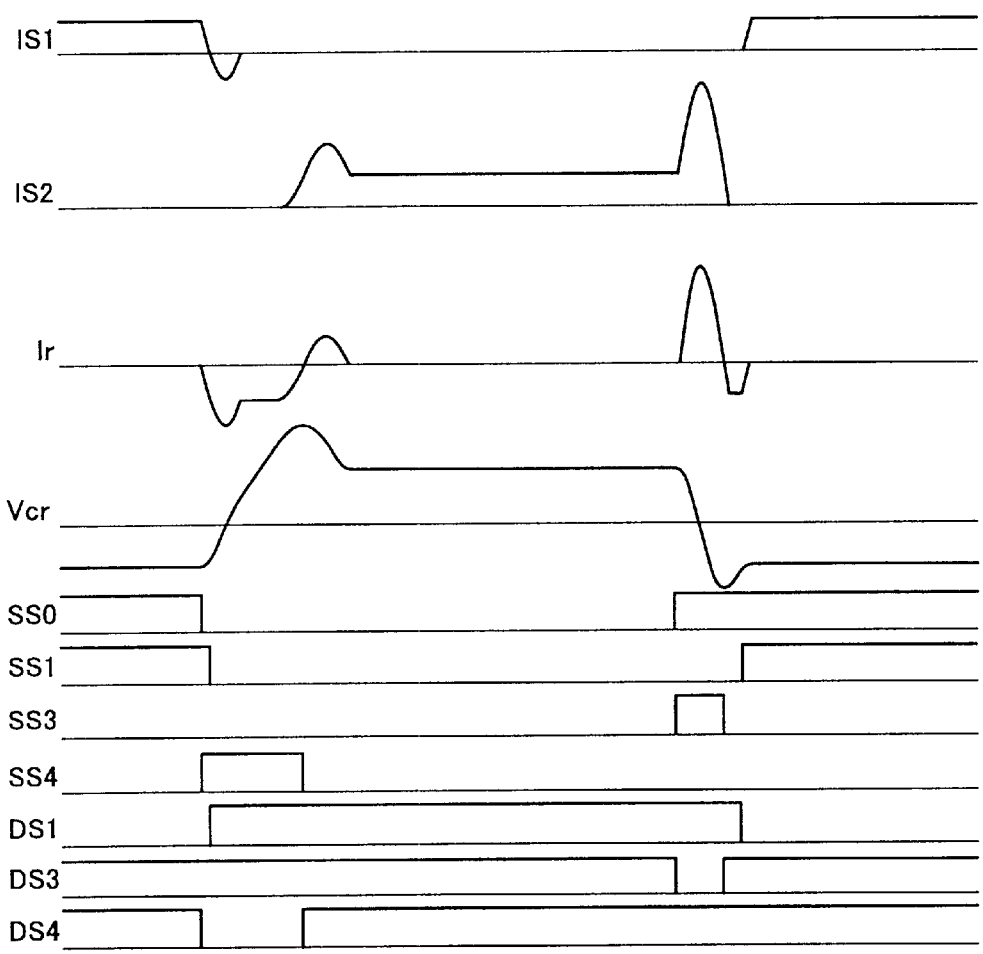
FIG. 21 is a waveform diagram showing current/voltage waveform in each part of the circuit shown in FIG. 20.

Hereat, with reference to waveform diagrams, a control method for making the switching loss approximately zero and also reducing the current surge and voltage surge occurring upon switching will be described. FIG. 21 shows waveforms of each part during the time when the main switch device is switched in one cycle, wherein a continuous current IL1 passes through the inductor L1 during one cycle.

Figure 22:
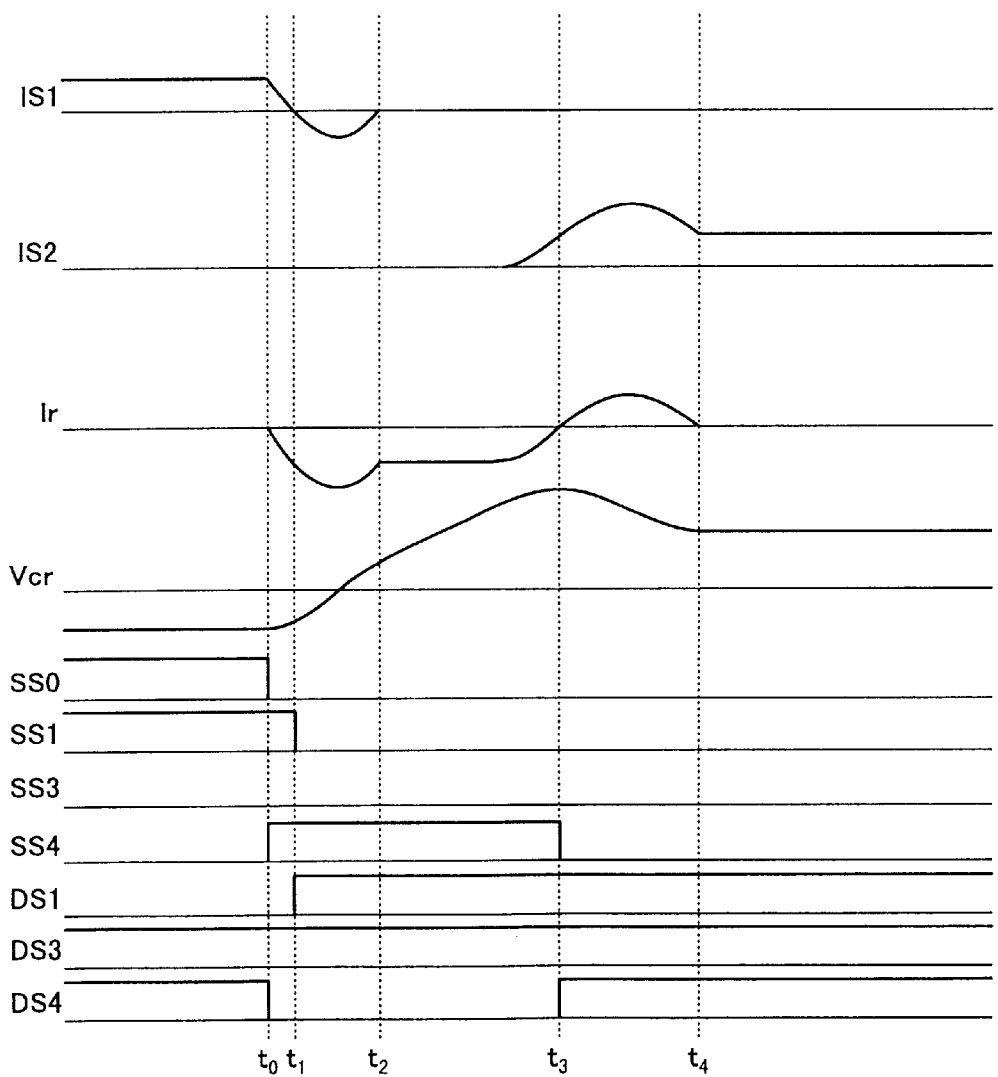
FIG. 22 is an partial enlarged diagram showing the waveform shown in FIG. 21.

FIG. 22 shows a process through which the main switch device S1 is turned off at zero current, and the auxiliary switch device S4 is turned on and turned off at zero current. During the main switch is in ON condition, the inductor L1 is excited to make an inductor current IL1 pass through the main switch device S1 in the direction of the arrow of IS1 shown in FIG. 20. An initial voltage value of the capacitor Cr is maintained in the opposite polarity with respect to that shown in FIG. 20. When the signal SS0 from the output voltage control circuit raises, the drive signal SS4 is raised by this signal as a trigger to make the auxiliary switch device S4 turn on, in the switching timing control circuit. Then a resonance is initiated in a path of the auxiliary switch device S4, the main switch device S1, the inductor Lr, and the capacitor Cr according to an initial charged voltage value of the resonance capacitor Cr. At this moment, since a resonance current Ir starts passing from zero in the auxiliary switch device S4, the zero current turn-on in the auxiliary switch device S4 is achieved, thereby the turn-on loss becomes approximately zero. After the auxiliary switch device S4 is turned on, a current IS1 passing through the main switch device S1 starts decreasing, and the current IS1 passing through the main switch device S1 become zero at time t1. After time t1, the diode D1 connected in parallel with the main switch device S1 is turned on. By turning off the main switch device S1 during this period, the zero current turn-off in the main switch device S1 is achieved so that the turn-off loss can substantially be omitted. In FIG. 22, when the current IS1 of the main switch device S1 goes through near to zero, the detection signal DS1 of the current detection device is raised and is input into the switching timing control circuit. The drive signal SS1 is fallen by this signal as a trigger to make the main switch device S1 turn off.

After the main switch S1 is turned off, the resonance current Ir keeps passing through the diode D1. When a current at the diode D1 becomes zero at time t2, the resonance is terminated. After time t2, since the current IL1 of the inductor L1 passes through a path of the resonance inductor Lr, the resonance capacitor Cr, and the auxiliary switch device S4, the resonance capacitor Cr is charged.

Then when a voltage of the resonance capacitor Cr exceeds the output voltage, the resonance current Ir starts decreasing. At the same time, the output diode D0 is turned on so that a current, which is a difference between the inductor current IL1 and the resonance current Lr, passes through the output diode D0.

When the resonance is advanced, the direction of the current IS2 passing through the auxiliary switch device S2 at time t4 so that the detection signal DS2 of the current detection device may be raised and then is input into the switching timing control circuit. Then the drive signal SS2 is fallen by the rise of the detection signal DS2 as a trigger to make the auxiliary switch device S2 turn off. At this moment, the auxiliary switch device S2 is turned off at zero current so that little or no turn-off loss may occur. After time t4, the output diode D0 is turned on and a current given by adding the resonance current resonance current Ir to the inductor current IL1.

When the resonance is advanced, the direction of the resonance current Ir passing through the auxiliary switch device S4 is changed at time t3. Then the detection signal DS4 is raised and is input into the switching timing control circuit. Then the drive signal SS4 is fallen by the rise of the signal DS4 as a trigger to make the auxiliary switch device S4 turn off. At this moment, the auxiliary switch device S4 is turned off at zero current so that little or no turn-off loss may occur.

After time t3, the resonance current Ir passes through the diode D3. When the resonance is further advanced, the resonance current is blocked by the diode D4 at time t4 to terminate the resonance. After time t4, since the inductor current IL1 passes through the output diode D0, an exciting energy of the inductor L1 is transferred to the output capacitor C0.

Figure 23:
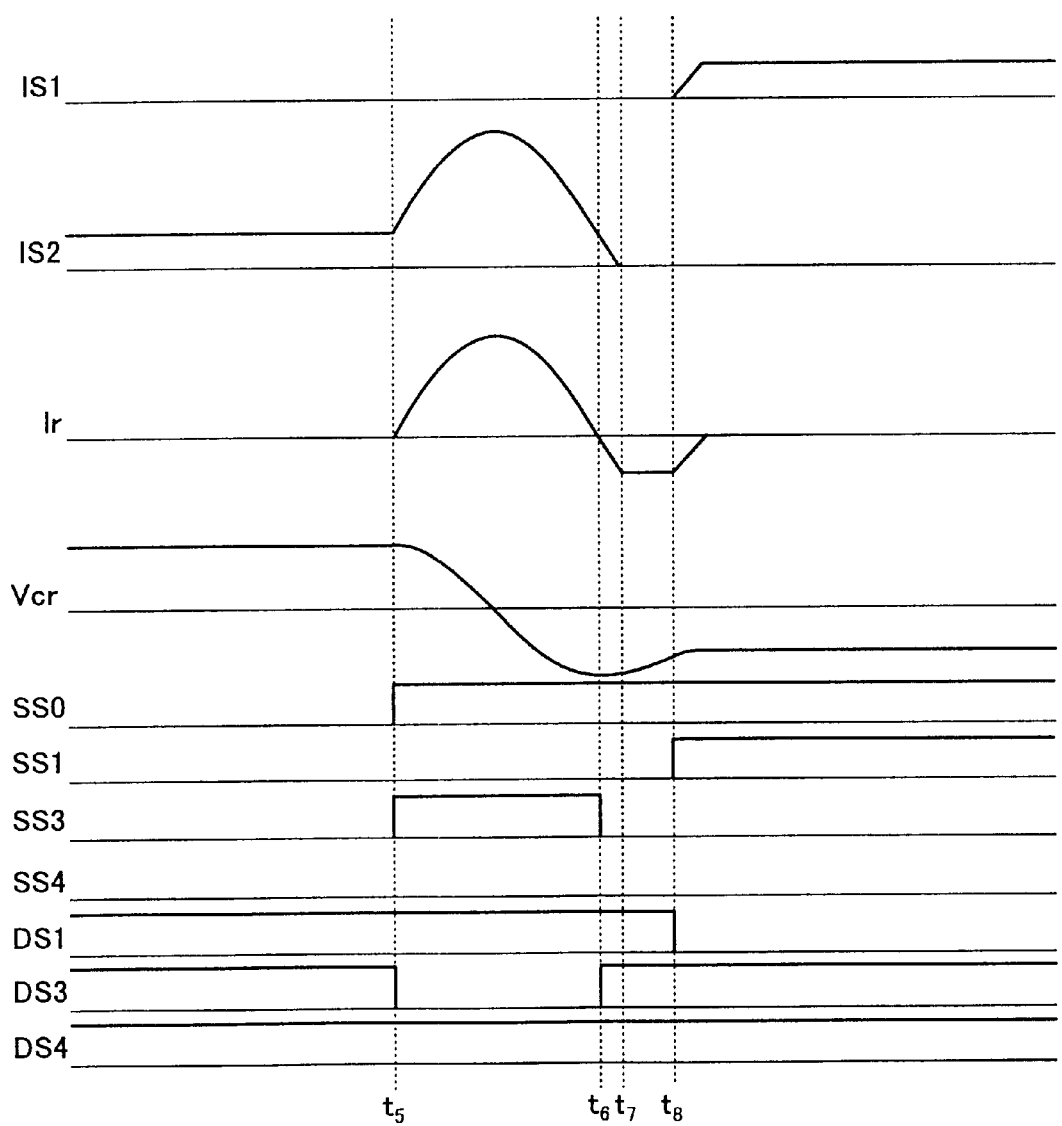
FIG. 23 is an partial enlarged diagram showing the waveform shown in FIG. 22.

FIG. 23 shows a process through which the main switch means S1 is turned on at zero current, and the auxiliary switch device S3 is turned on and turned off at zero current.

The inductor current IL1 passes through the output diode D0. The initial voltage value of the capacitor Cr is maintained in the polarity shown in FIG. 20 by the resonance generated at the time when the main switch device S1 is turned off. When the signal SS0 from the output voltage control circuit falls, the drive signal SS3 is raised by this signal as a trigger to make the auxiliary switch device S3 turn on, in the switching timing control circuit. When the auxiliary switch device S3 is tuned on at time t5, a resonance is initiated in a path of the resonance capacitor Cr, the resonance inductor Lr and the output diode D2 according to the initial voltage value of the resonance capacitor Cr. At this moment, since a resonance current starts passing from zero in the auxiliary switch device S3, the zero current turn-on in the auxiliary switch device S3 is achieved, thereby the turn-on loss becomes approximately zero.

The resonance current passes in the direction of the arrow shown in FIG. 20 so that a current given by adding the inductor current IL1 to the resonance current Ir may pass through the diode D0. When the resonance is advanced, the direction of the current passing through the auxiliary switch device S3 is changed at time t6. Then the detection signal DS3 is raised and is input into the switching timing control circuit. Then the drive signal SS3 is fallen by the rise of the signal DS3 as a trigger to make the auxiliary switch device S3 turn off. At this moment, the auxiliary switch device S3 is turned off at zero current so that little or no turn-off loss may occur.

After time t6, when the resonance is advanced and the current passing through the diode D0 finally becomes zero at time t7, all of the inductor current IL1 passes into the resonance circuit.

The switching timing control circuit is adapted to control to make the main switch device S1 turn on after elapsing a time period (t8−t5) from the auxiliary switch device S3 is turned on. At this moment, the time period (t8−t5) is set to make it longer than the time period (t7−t5), for performing the zero current switching.

When the main switch device S1 is turned on at time t8, a path of the output capacitor C0, the diode D3, the resonance capacitor Cr, and the resonance inductor Lr is created, and the resonance current Ir passing with the same magnitude as the inductor current starts decreasing. Thus the current IS1 passing through the main switch device S1 becomes a value given by taking the resonance current Ir from the inductor current IL1 and is increased from zero with having a particular inclination, thereby the zero current turn-on in the main switch device S1 is established so that the turn-on loss may become approximately zero.

During the time period (t8−t7), the resonance capacitor Cr is charged with the inductor current IL1 so that the initial voltage value of the resonance capacitor Cr at the time when conducting a subsequent resonance may be adjusted by this time period. Therefore, the zero current switching can certainly be achieved by setting a peak value of the resonance current Ir lager than the inductor current IL1.

According to the control method as described above, in all of the main switch device S1 and the auxiliary switch devices S3,S4, the zero current turn-on and the zero current turn-off is made possible so that the switching loss can be made approximately zero, no voltage surge and no current surge may occurs, and the noise can also be reduced.

In this control method, the resonance current is passed by turning on the auxiliary switch device before the main switch device is switched, and the main switch device can be switched at zero current created by the resonance current thereof.

When the auxiliary switch device is turned on, the capacitor Cr is remained at an initial voltage value. The amplitude of the resonance current Ir is determined by the initial voltage of the capacitor Cr and a characteristic impedance of the resonance circuit. For achieving the zero current switching, it needs that, after the auxiliary switch is turned on, the resonance current should be equal to or larger than the inductor current IL1, and a diode D1, which is connected in parallel with the main switch deviceS1, should be turned on. Where Vc is the initial voltage value of the resonance capacitor Cr at the time when the auxiliary switch device is turned on, the condition for achieving the zero current switching in the main switch device is given by the following formula (3).

$$Vc \cdot IL1 \cdot \sqrt{(LR/CR)} \quad (3)$$

where,
- IL1 is a maximum value of inductor current,
- LR is an inductance value,
- CR is a capacitance value, Accordingly, the zero current switching can be achieved by setting to make the initial voltage value of the resonance capacitor Cr satisfy this condition.

Figure 24:
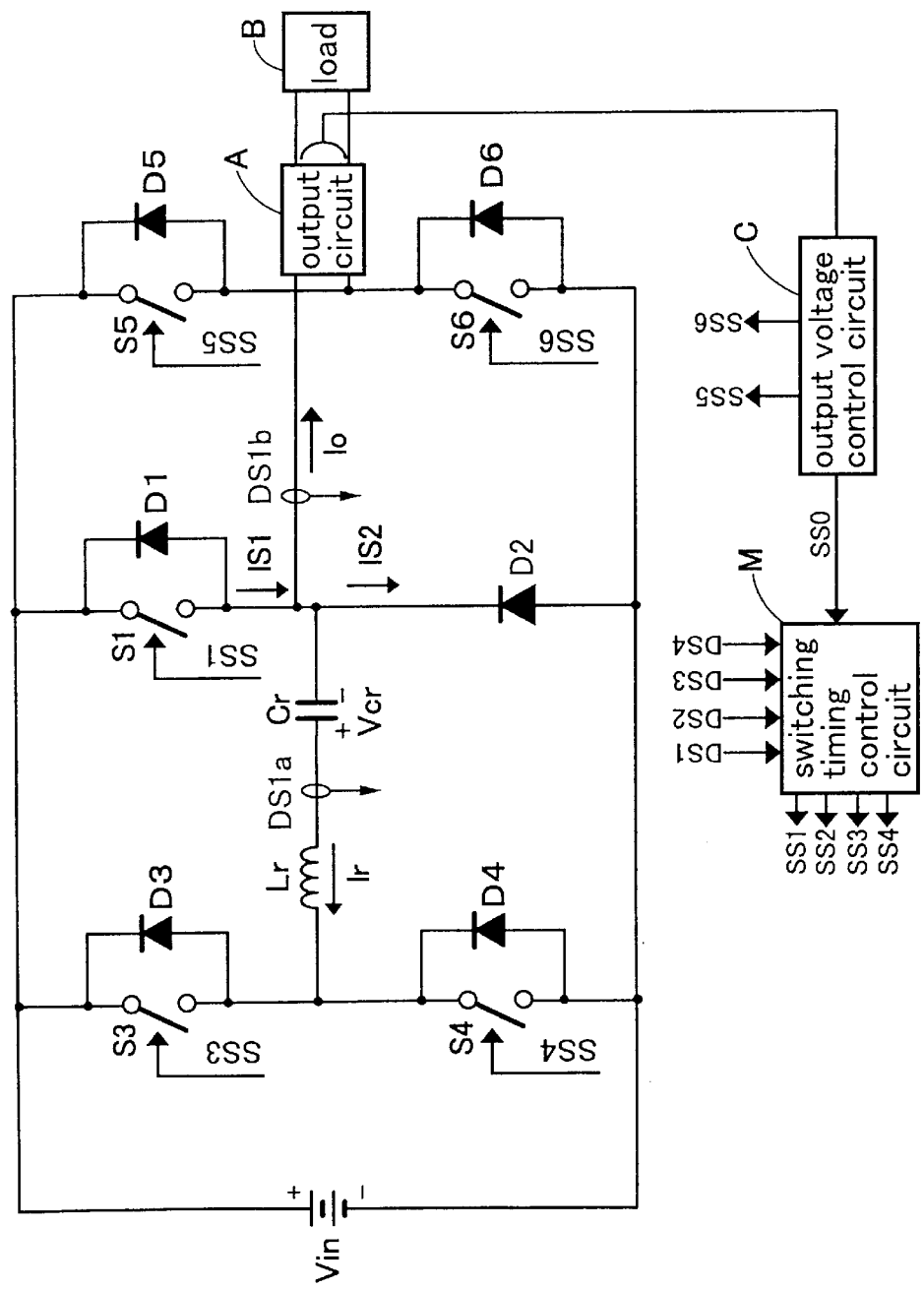
FIG. 24 is a circuit diagram showing an example of another control according to the present invention, with like manner as FIG. 2.

FIG. 24 shows a modification of the circuit shown in FIG. 2. In this circuit, there is provided a current detector in a serial circuit composed of an inductor Lr and a capacitor Cr to generate a current signal DS1$a$ indicating a current passing through this serial circuit. At the same time, there is provided another current detector in an output line connecting between a connection point of the main switch device S1,S2 and an output circuit A to generate a current signal DS1$b$ indicating a current passing through this output line. In this case, a point where sum of two current signals DS1$a$,DS1$b$ is zero or approximately zero is set as a threshold. When the sum of two current signals DS1$a$,DS1$b$ cross over this threshold, the main switch device S1 is turned off. According to this control, the main switch device S1 can be turned off at zero current. In the auxiliary switch device S3, a point where the current signal DS1$a$ is zero or approximately zero is set as a threshold. When the current signals DS1$a$ crosses over this threshold, the auxiliary switch device S3 is turned off. According to this control, the auxiliary switch device S3 can be turned off at zero current.

Hereinafter a control for making the main switch device turn on will be described. When the main switch device is in OFF condition, a current passing in the direction shown by arrow lo in the output circuit A passes through the diode D2. The resonance capacitor Cr is maintained at an initial voltage value. When the signal SS0 from the output voltage control circuit C raises, the drive signal SS4 is raised by this signal as a trigger to make the auxiliary switch device S4 turn on. As a result, a resonance current starts passing in the direction shown as Ir. When the resonance is advanced, a zero-cross that a current passing through the switch device S4 crosses over zero point is occurred. This zero-cross is indicated by the detection output signal DS1$a$ of the current detector which is connected between the inductor Lr and the capacitor Cr. The zero-cross is detected by making the detection output signal pass through a comparator (not shown) to generate a detection signal. The drive signal SS4 is fallen by the detection signal to make the auxiliary device S4 turn off. After the aforementioned zero-cross is occurred, the diode D4 connected in parallel with the auxiliary device S4 is turned on. Thus, even when some time lag is occurred in the turn-off timing of the auxiliary switch device, the auxiliary switch device S4 can be turned off at zero current as long as during the diode D4 is in On condition.

When the resonance is advanced, the resonance current and the output current Io passing through the output circuit become even. Thus the current IS1 passing through the main switch device S1 and the current IS2 passing through the diode D2 become zero. As a result, a voltage between both ends of the diode D2 starts increasing. A control signal can be obtained by detecting the voltage between both ends of the diode D2 and making this detection signal pass through the comparator having the threshold in the output voltage control circuit C. The drive signal SS1 is raised by this control signal to make the main switch device S1 turn on. At this moment, the current passing through the diode D2 becomes zero, thereby no loss cased from a recovery current occurs. In addition, the current passing through the main switch device S1 is increased with having a particular inclination so that the zero current turn-on of the main switch device S1 can be achieved.

Figure 25:
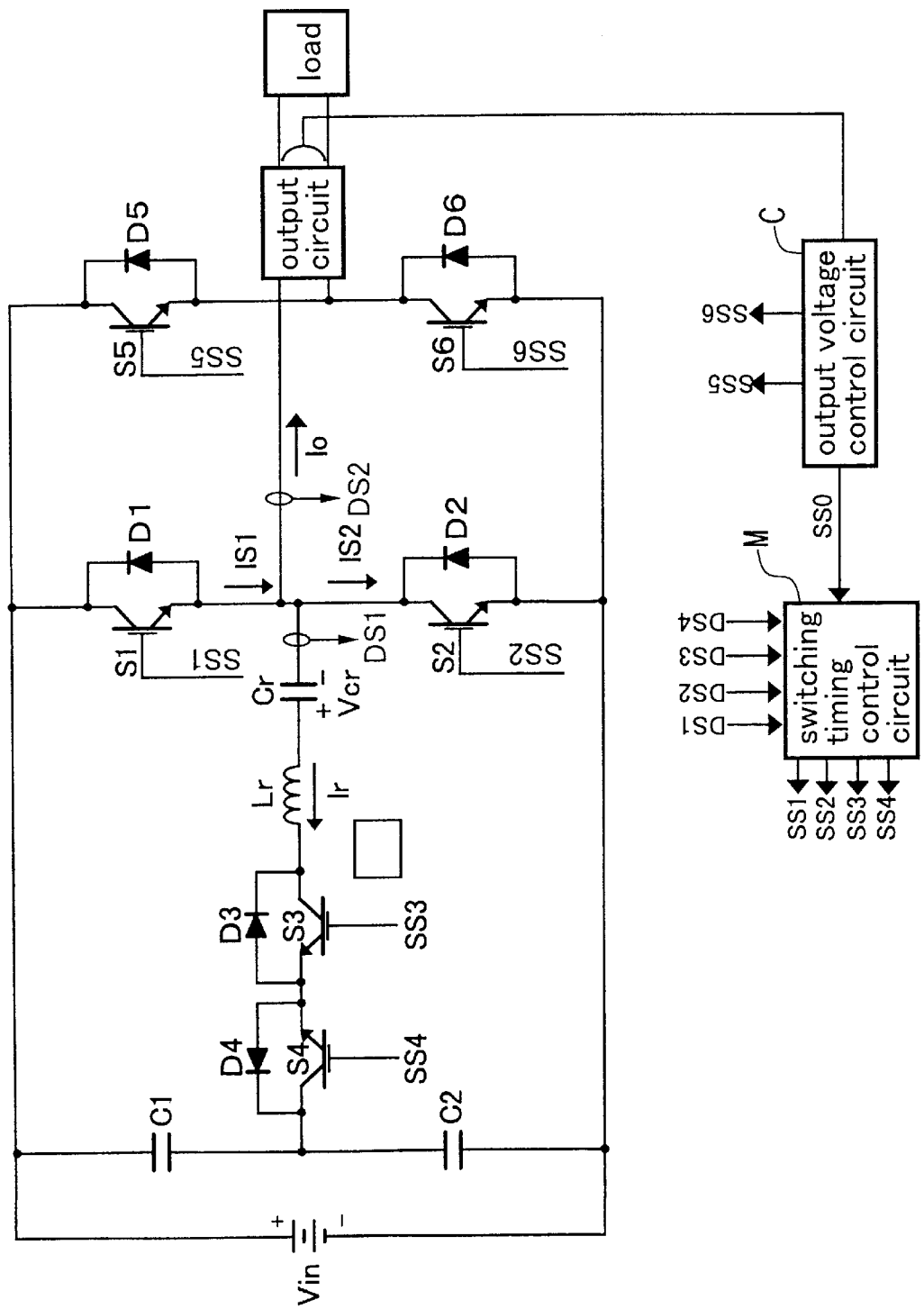
FIG. 25 is a circuit diagram showing an example of other control according to the present invention, with like manner as FIG. 7.

FIG. 25 shows other example for switching at zero current with the circuit as same as FIG. 7. The main switch devices S1,S2 and the auxiliary switch devices S3,S4 are switched at high frequency, and the main switch devices S5,S6 are switched at low frequency which is the frequency as same as an output voltage waveform. An output volt alternating current is generated at an output terminal of the output circuit, and a signal detecting which is created by detecting this output voltage is input into the output voltage control circuit C. The output voltage control circuit C outputs a square wave signal SS0 with duty ratio control, and this squared wave signal is input into a switching timing control circuit M. The switching timing control circuit M generates drive signals for controlling the switch device S1,S2,S3,S4, S5,S6.

The current detector is provided in a series resonance circuit composed of the inductor Lr and the capacitor Cr. The current detector generates a current detection signal DS1 where the opposite direction with respect to that shown by the arrow Ir is defined as positive. For detecting a load current, a current detector is provided in an output line from the connection point of the main switch devices S1,S2 to an output circuit to generate a current detection signal DS2 where the opposite direction with respect to that shown by the arrow Io is defined as positive. Further a voltage detector is provided for detecting a voltage of both sides of the resonance capacitor Cr to generate a voltage signal Vcr.

Operations of each switch device in this circuit are same as that described in conjunction with FIG. 7. Therefore the detailed description on the operation will be omitted, and the operation for the zero current turn-off of the main switch device will be described. Waveforms are shown in FIG. 12. Hereat, the auxiliary switch device S3 and the main switch device S6 are in ON condition during one cycle of the switching. When the main switch device S1 is in ON condition, the current Io passes through the main switch devices S1,S6 in the direction of the arrow. The resonance capacitor Cr is maintained at an initial voltage. In this condition, when the control signal SS0 raises, the drive signal SS4 is raised by this signal as a trigger to make the auxiliary switch device S4 turn on. At this moment, the resonance current Ir starts passing in the direction of the arrow. As a result, a current passing through the main switch device S1 starts decreasing. When the resonance is advanced, the current at the main switch device S1 crosses over the zero-point and the sum of the current signals DS1,DS2 also cross over the zero-point(hereinafter, refer to zero-cross). The zero-cross is detected by making the signal, which indicates the sum of the current signals DS1,DS2, pass through the comparator having the threshold. Thus the drive signal SS1 is fallen to make the main switch device S1 turn off.

After the current of the main switch device S1 and the signal indicating the sum of the current signal DS1,DS2 cross over the zero-point as described above, the diode D1 connected in parallel with the main switch means S1 is in ON condition. Even when some time lag is occurred in the turn-off timing of the main switch device S1 due to control delay, the auxiliary switch device S4 can be turned off at zero current as long as during the diode D1 is in On condition.

When the resonance is advanced, the polarity of the resonance capacitor Cr and the voltage signal Vcr of the both ends is inverted. This inversion of the polarity of voltage signal is detected by the comparator. Thus The drive signal SS2 is raised to make the main switch device turn on.

When the resonance is further advanced, the resonance current Ir passing through the series resonance circuit composed of the inductor Lr and the resonance capacitor Cr cross over the zero-point (hereinafter, refer to zero-cross). This zero-cross is detected as the current signal DS1. Thus the drive signals SS3,SS4 are raised to make the auxiliary switch devices S3,S4 turn off. Even when some time lag is occurred in the turn-off timing of the auxiliary switch device S3,S4 due to control delay, the resonance is terminated by the diode D3 so that the zero current turn-off in the auxiliary switch device S3 can be achieved.

A control for making the main switch device S1 turn on at zero current will be described hereinafter. Waveforms are shown in FIG. 13. In Off condition of the main switch device S1, the output current Io passes through the diode D2 connected in parallel with the main switch device S2 into to the output line in the direction on the arrow, and the resonance capacitor Cr is maintained at the initial voltage. Hereat, when the drive signal SS4 is raised, the auxiliary switch device S4 is turned on and the resonance current Ir starts passing in the direction shown by the arrow. When the resonance is advanced, the current passing through the diode D2 starts decreasing and finally becomes zero. As a result, the voltage of both ends of the diode D2 starts increasing. The voltage between both ends of this diode D2 is detected. This detected signal is passed through the comparator having the threshold in the output voltage control circuit C so that the control signal can be obtained. The drive signal is raised by this signal to make the main switch means S1 turn on. At this moment, since the current passing through the diode D2 becomes zero, no loss cased from a recovery current occurs. In addition, the current passing through the main switch device S1 is increased with having a particular inclination so that the zero current turn-on of the main switch device S1 can be achieved.

When the resonance is advanced, the zero-cross occurs in the resonance current Ir. By detecting this zero-cross signal with the comparator having the threshold, the drive signals SS3,SS4 are raised to make the auxiliary switch devices S3,S4 turn off. Even when some time lag is occurred in the turn-off timing of the auxiliary switch device S3,S4 due to control delay, the resonance is terminated by the diode D4 so that the zero current turn-off in the auxiliary switch device S4 can be achieved.

Figure 26:
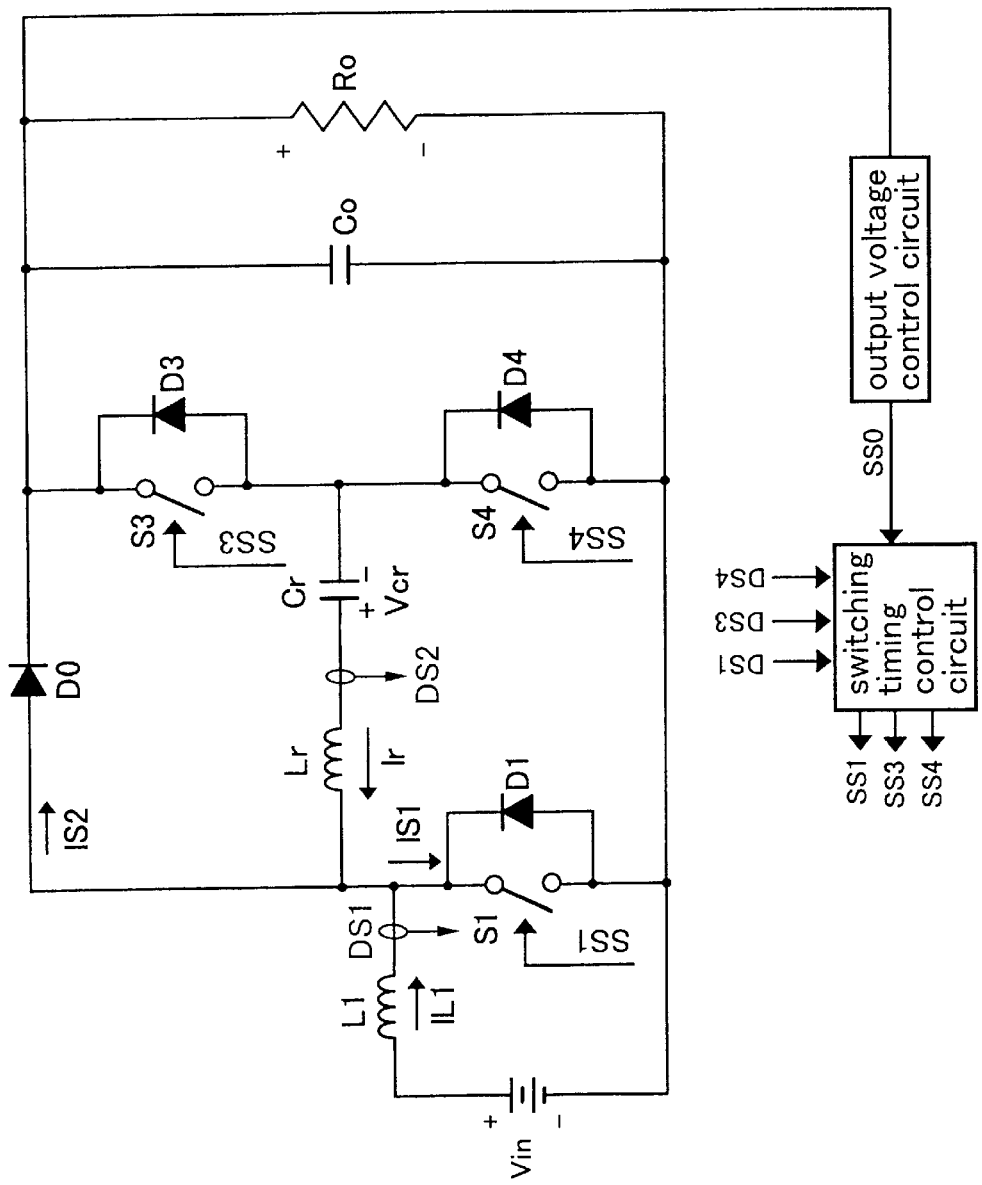
FIG. 26 is a circuit diagram showing an example of further control according to the present invention, with like manner as FIG. 20.

FIG. 26 shows other example for performing the zero current switching in the circuit shown in FIG. 20. First, a process through which the main switch device S1 is turned off at zero current. When the main switch device S1 is in ON condition, the input current IL1 passes through the main switch device S1. The resonance capacitor Cr is maintained at an initial voltage. In this condition, when the drive signal SS4 raises, the auxiliary switch device S4 is turned on, and the resonance current Ir starts passing in the opposite direction with respect to that of the arrow. As a result, a current passing through the main switch device S1 starts decreasing. When the resonance is advanced, the current IS1 at the main switch device S1 crosses over the zero-point. At same time, the zero-cross occurs in the current signal indicating the sum of the detection signal DS1 of the input current and the detection signal DS2 of the resonance current. By detecting this zero-cross, the drive signal SS1 is fallen to make the main switch device S1 turn off. After the zero-cross occurs in the current signal indicating the sum of the zero-cross current signals DS1, DS2, the diode D1 connected in parallel with the main switch device S1 is in ON condition. Thus, even when some time lag is occurred in the turn-off timing of the main switch device S1 due to control delay, the main switch device S1 can be turned off at zero current as long as during the diode D1 is in On condition.

When the resonance is advanced, the zero-cross occurs in the current passing through the switch device S4. This zero-cross is detected as the current signal DS2. Hereat, the drive signals SS4 are raised to make the switch devices S4 turn off. After the zero-cross occurs in the current of the switch device S4, the diode D4 connected in parallel with the main switch device S4 is in ON condition. Therefore, even when some time lag is occurred in the turn-off timing of the main switch device S4 due to control delay, the main switch device S4 can be turned off at zero current as long as during the diode D4 is in On condition.

A process through which the main switch device S1 is turned on at zero current will be described hereinafter. In Off condition of the main switch device S1, the input current IL1 passes through the diode D0 comprising the switch device, and the resonance capacitor Cr is maintained at the initial voltage. Hereat, when the drive signal SS3 is raised, the auxiliary switch device S3 is turned on. Thus the resonance current Ir starts passing in the direction shown by the arrow. When the resonance is advanced, the current passing through the auxiliary switch device S3 crosses over the zero-point. This zero-cross current is detected as the current signal DS2. Then the drive signal SS3 is fallen by this signal to make the auxiliary switch device S3 turn off. After the zero-cross occurs in this current, the diode D3 connected in parallel with the auxiliary switch device S3 is in ON condition. Therefore, even when some time lag is occurred in the turn-off timing of the auxiliary switch device S3 due to control delay, the auxiliary switch device S3 can be turned off at zero current as long as during the diode D3 is in On condition.

When the resonance is further advanced, the resonance current Ir and the input current Ill become even so that the current passing through the main switch device S1 and the current passing through the diode D0 become zero. Therefore, the voltage between both ends of the main switch device S1 starts increasing. This voltage increase is detected by the comparator having the threshold so that the drive signal may be raised to make the main switch device S1 turn on. At this moment, the current passing through the diode D0 becomes zero, thereby no loss occurs. In addition, the current passing through the main switch device S1 is increased with having a particular inclination so that the zero current turn-on of the main switch device S1 can be achieved.

Figure 27:
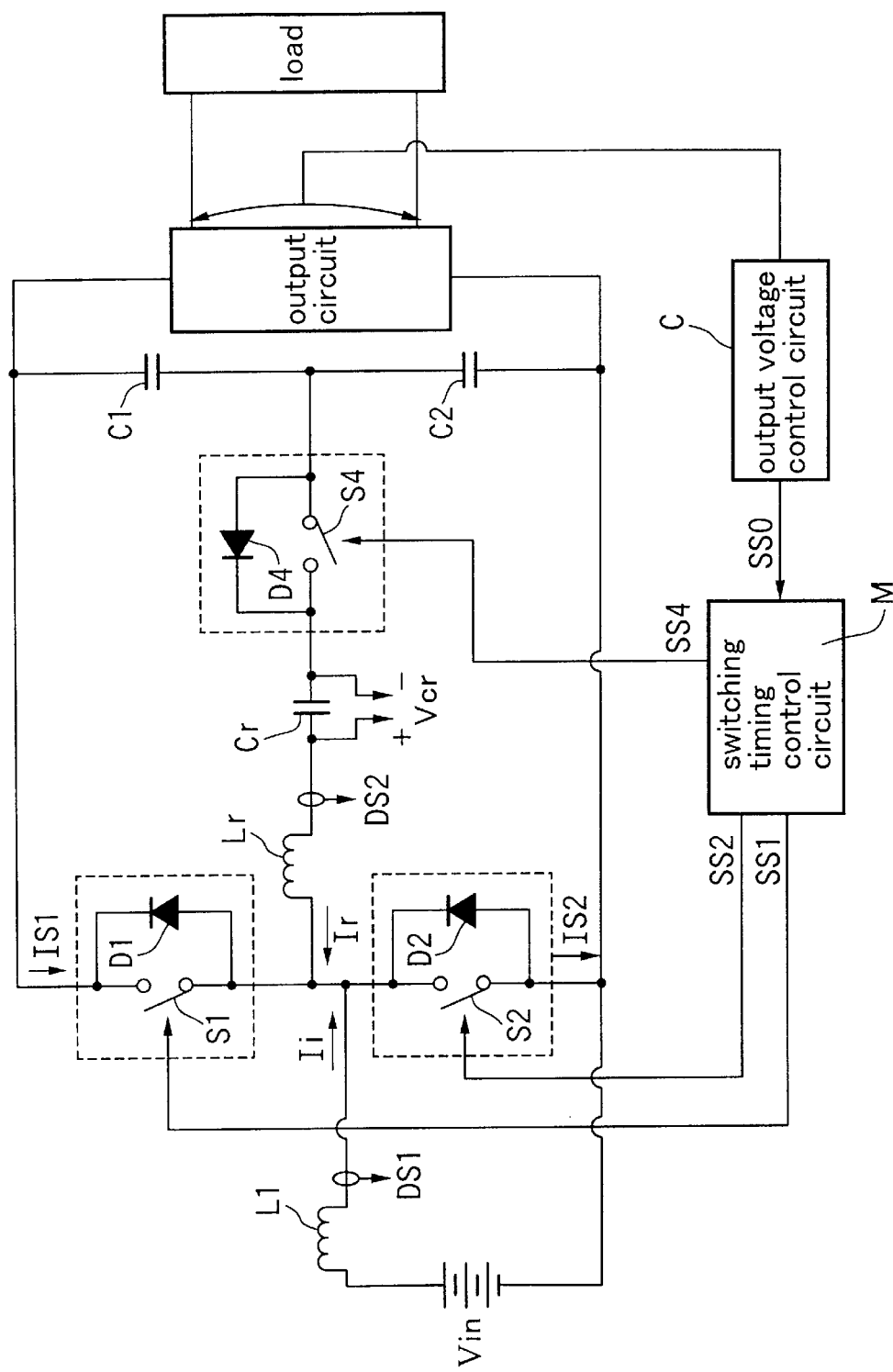
FIG. 27 is a circuit diagram showing a control in an example where the position of the input/output terminal is varied from that in FIG. 25, in a circuit similar to the circuit shown in FIG. 25.

FIG. 27 shows further embodiment of a boost up converter according to the present invention. In this embodiment, with using a circuit as substantially same as that shown in FIG. 25, the position of the input and output terminals is modified. That is, a terminal of connection point of two main switch devices S1,S2 is applied to one of input terminals and terminals of both ends of the main switch devices S1,S2 are applied to output terminals. To detect the resonance current, a current detector is disposed in a resonance circuit composed of the inductor Lr and the capacitor Cr to create a current signal DS2 where the arrow direction of the current Ir is the positive direction. Another current detector is disposed in the input line extending to the input terminal to create a current signal DS1 where the arrow direction of the current Ii is the positive direction.

In this circuit, a process through which the main switch device S2 is turned off at zero current will be described. Waveforms are same as that shown in FIG. 9. However, the currents lS1,lS2 in FIG. 9 are respectively corresponding to the current IS2,IS1 in FIG. 27. When the main switch device S2 is in ON condition, the current li shown by the arrow on the input line passes through the main switch device S2. The resonance capacitor Cr is maintained at an initial voltage. In this condition, when the control signal SS0 from the output voltage control circuit C is fallen, the drive signal SS4 from the switching timing control circuit M is raised by this signal as a trigger to make the auxiliary switch device turn on. As a result, the current passing through the main switch device S2 is decreased by the resonance current Ir, results in the zero-cross where the decreased current crosses over the zero-point. At the sane time, the current signal indicating the sum of the current Ir and The current Ii causes the zero-cross. The drive signal is fallen by detecting this zero-cross current to make the main switch device turn off. After aforementioned zero-cross occurs, the diode D2 connected in parallel with the main switch device S2 is turn to ON condition by the resonance current Ir. Therefore, even when some time lag is occurred in the turn-off timing of the main switch device S2 due to control delay, the main switch device S2 can be turned off at zero current as long as during the diode D2 is in On condition.

When the resonance is advanced, the polarity of the resonance capacitor Cr and the both ends voltage Vcr is inverted. By detecting this inversion of the polarity, the drive signal SS1 is raised to make the main switch device S1 turn on. When the resonance is further advanced, the resonance current Ir passing through the auxiliary switch device causes the zero-cross. This zero-cross is detected as the current signal DS2. Thus the drive signals SS4 are raised to make the auxiliary switch devices S4 turn off. In this case, according to the function of the diode D4 connected in parallel with the auxiliary switch device S4, the auxiliary switch device S4 can be turned off at zero current as long as during the diode D4 is in On condition.

A process through which the main switch device S2 is turned on at zero current will be described hereinafter. However, the currents IS1,IS2 in FIG. 10 are respectively corresponding to the current IS2,IS1 in FIG. 27. In this case, the current of the input line passes through the diode D1 connected in parallel with the main switch device S1, and the resonance capacitor Cr is maintained at the initial voltage. Hereat, when the control signal from the input voltage control circuit C is raised, the drive signal SS4 is raised by this signal as a trigger to make the auxiliary switch means S4 turn on. Thus the resonance current starts passing in the opposite direction with respect to that of the arrow Ir.

When the resonance is advanced, the current IS1 passing through the diode D1 starts decreasing. When this current IS1 becomes zero, the voltage of both ends of the diode D1 starts increasing. The control signal can be obtained by detecting the voltage of both ends of the diode D1 and passing it through a comparator having a threshold in the output voltage control circuit. The drive signal SS2 is raised by this control signal to make the main switch device S2 turn on. At this moment, the current passing through the diode D1 becomes zero, thereby no loss cased from a recovery current occurs. In addition, the current passing through the main switch device S2 is increased with having a particular inclination so that the zero current turn-on of the main switch device S1 can be achieved.

When the resonance is further advanced, the resonance current Ir passing through the auxiliary switch device S4 causes the zero-cross where the resonance current crosses over the zero-point. This zero-point of the resonance current is detected as the current signal DS2. The drive signal SS4 is raised in to make the main switch device S4 turn off, response to this detection. By the function ob the diode D4, even when some time lag is occurred in the turn-off timing of the main switch device S4, the resonance is terminated by the diode D4 so that the zero current turn-off in the auxiliary switch device S4 can be achieved, as well as the aforementioned embodiments.

While the present invention has been described with respect to various specific example and embodiments, it is to be understood that the present invention is not limited thereto, but only by the claim.

What is claimed is:

1. In a partial resonance PWM converter including: a main switch circuit composed of first and second main switch devices, said main switch circuit being connected in parallel with a DC power supply; diodes respectively connected in parallel with each of said main switch devices in the opposite direction of a polarity of said DC power supply; an output circuit located at a juncture of said main switch devices;

an auxiliary switch circuit composed of first and second auxiliary switch devices, said auxiliary switch circuit being connected in parallel with said DC power supply; diodes respectively connected in parallel with each of said auxiliary switch devices in the opposite direction of the polarity of said DC power supply; and a series resonance circuit composed of a capacitor and an inductor, said series resonance circuit being inserted between the juncture of said first and second main switch devices and a juncture of said first and second auxiliary switch devices;

wherein said first and second main switches are alternatively switched to output AC or DC power, said converter comprising, control means for controlling a switching timing to make said auxiliary switch device turn on just before said main switch device is switched, and, at least in the main switch devices, to make said main switch device turn off when said diode connected in parallel with each of said main switch devices is turned nearly to ON condition or during ON condition of said diode, whereby said main switch device can be turned off at zero current, and to make one of said main switch devices turn on during said first and second main switch devices is in OFF condition and a load current passes through said series resonance circuit, whereby a current passing through said main switch device is increased from zero with having a particular inclination so that said main switch device can be turned on at zero current.

2. A partial resonance PWM converter as defined in claim 1, wherein said control means is adapted to control a switching timing in said auxiliary switch device to make said auxiliary switch device turn off during ON condition of said diode connected in parallel with each of said auxiliary switch devices.

3. In a partial resonance PWM converter including: a main switch circuit composed of first and second main switch devices; a capacitor circuit composed of first and second capacitors, wherein said main switch circuit and said capacitor circuit are respectively connected in parallel with a DC power supply; diodes respectively connected in parallel with each of said main switch devices in the opposite direction of a polarity of said DC power supply;

a bi-directional switch device which is composed of two auxiliary switch devices connected in series with each other and diodes respectively connected in parallel with each of said auxiliary switches; a series resonance circuit which is composed of an inductor and a capacitor, wherein said a bi-directional switch device and a series resonance circuit are inserted in series between a connection point of said first and second main switch devices and a connection point of said first and second capacitors; and an output circuit located at the connection point of said first and second main switch devices; wherein said first and second main switches are alternatively switched to output AC or DC power, said converter comprising, control means for controlling a switching timing to make said auxiliary switch device turn on just before said main switch device is switched, and, at least in the main switch devices, to make said main switch device turn off when said diode connected in parallel with each of said main switch devices is turned nearly to ON condition or during ON condition of said diode, whereby said main switch device can be turned off at zero current, and to make one of said main switch devices turn on during said first and second main switch devices is in OFF condition and a load current passes through said series resonance circuit, whereby a current passing through said main switch device is increased from zero with having a particular inclination so that said main switch device can be turned on at zero current.

4. A partial resonance PWM converter as defined in claim 3, wherein said control means is adapted to control a switching timing in said auxiliary switch device to make said auxiliary switch device turn off during ON condition of said diode connected in parallel with each of said auxiliary switch devices.

5. In a partial resonance PWM boost converter including: an inductor and a main switch device which are connected in series with a DC power supply; one terminal of an output capacitor connected to a connection point of said inductor and said main switch device via an output diode; another terminal of said capacitor connected to a negative electrode of said DC power supply; first diode connected in parallel with said main switch device; first and second auxiliary switch devices which are connected in series with each other, first and second auxiliary switch being connected in parallel with said output diode; second and third diodes respectively connected to the first and second auxiliary switch devices in the opposite polarity with respect to an output voltage; a series resonance circuit composed of a resonance inductor and a resonance capacitor, said series resonance circuit being inserted between a connection point of said first and second auxiliary switch devices and a connection point of said inductor and said main switch device; wherein, with making both poles of said output capacitor an output, said main switch device is switched by a PWM control so as to generate a stable DC voltage, said converter comprising, control means for controlling a switching timing to make said second auxiliary switch device turn on just before said main switch device is switched, and, in the main switch devices, to make said main switch device turn off when said diode connected in parallel with each of said main switch devices is turned nearly to ON condition or during ON condition of said diode, whereby said main switch device can be turned off at zero current.

6. A partial resonance PWM boost converter as defined in claim 5, wherein said control means is adapted to control a switching timing to make said main switch device turn on during all current of said inductor passes through said series resonance circuit where the current of said inductor is continuous during one switching cycle of said main switch device, whereby a current passing through said main switch device is increased from zero with having a particular inclination to make the zero current turn-on possible.

7. A partial resonance PWM boost converter as defined in claim 5, wherein said control means is adapted to control a switching timing in said auxiliary switch device to make said auxiliary switch device turn off when said diode, which is connected in parallel with said auxiliary switch device, is in ON condition.

8. A converter comprising: first main switch device and second main switch device which are connected in series with each other, said first main switch device and second main switch device being connected between first terminal and second terminal; third terminal located at a connection point between said first main switch device and second main switch device;

a series resonance circuit composed of a inductor and a capacitor, which are connected in series, said series resonance circuit being connected to a connection point between said first main switch device and second main switch device; a diode having a forward direction which directs from said second main switch device to said first main switch device, said diode being connected in parallel with each of said main switch devices, wherein, with selecting either two of said first, second, and third terminals as input terminals, a DC power supply is connected to the two terminals selected as the input terminals;

a control means for generating an output between the output terminals by alternatively switching said first and second main switch devices; and an auxiliary switch device where a resonance circuit is completed jointly with said series resonance circuit by making it ON condition when either one of said main switch devices is in ON condition, wherein said control means is adapted to control a switching timing to make said main switch device turn off when said diode, which is connected in parallel with said main switch device, is turned closely to ON condition by the resonance current or during ON condition of said diode, whereby the zero current turn-off of said main device is made possible, and said control means is adapted control a switching timing to turn on said main switch device closely when, or after, a current passing through said main switch device becomes zero by making the resonance current run up to the value passing through said third terminal with making said auxiliary switch device turn on just before said main switch device is turned on to generate the resonance current, whereby a current passing through said main switch device is increased from zero with having a particular inclination to make the zero current turn-on possible.

9. A converter as defined in claim 8, wherein said auxiliary switch device includes first and second auxiliary switches, said first and second auxiliary switches, which are connected in series with each other, are connected between said first and second terminals, a diode having a forward direction, which is a direction toward the first terminal, is connected in parallel with each of said auxiliary switches, said series resonance circuit is connected to a connection point of said first and second auxiliary switches, and said control means is adapted to control a switching timing to make said auxiliary switches turn off when said diode, which is connected in parallel with said auxiliary switch, is turned closely to ON condition due to the resonance current passing through said series resonance circuit when said auxiliary switch is turned on, or during ON condition of said diode, whereby the zero current turn-off of the auxiliary switches is made possible.

10. A converter as defined in claim 9, wherein said control means is adapted to control a switching timing of said main switch device and said auxiliary switch by a signal based on a current passing through said series resonance circuit and a current passing through said third terminal.

11. A converter as defined in claim 9, wherein said control means is adapted to control a switching timing of said main switch device and said auxiliary switch by a signal based on a voltage of both ends of said main switch device.

12. A converter as defined in claim 8, further includes two capacitors, which are connected in series with each other, being connected between the first and second terminals, wherein said auxiliary switch device is inserted between a voltage divided point formed by said two capacitors and said series resonance circuit, said auxiliary switch device is composed of a semiconductor switch and a diode connected in parallel with said semiconductor, and said control means is adapted to control a switching timing to make said semiconductor switch of said auxiliary switch device turn off when said diode, which is connected in parallel with said semiconductor switch, is turned closely to ON condition due to a resonance current passing through said series resonance circuit when said semiconductor switch of said auxiliary switch device is turned on, or during in ON condition of said diode, whereby said semiconductor switch of said auxiliary switch device can be turned off at zero current.

13. A converter as defined in claim 12, wherein said control means is adapted to control a switching timing of said main switch device and said semiconductor switch of said auxiliary switch device by an current signal based on a current passing through said series resonance circuit and a current passing through said third terminal.

14. A converter as defined in claim 12, wherein said control means is adapted to control a switching timing of said main switch device and said semiconductor switch of said auxiliary switch device by a signal based on a voltage of both ends of said capacitor of said series resonance circuit.

* * * * *